US 8,986,842 B2

(12) United States Patent
Frauenrath et al.

(10) Patent No.: US 8,986,842 B2
(45) Date of Patent: Mar. 24, 2015

(54) COLOR CONVERSION FILMS COMPRISING POLYMER-SUBSTITUTED ORGANIC FLUORESCENT DYES

(75) Inventors: Holger Frauenrath, St-Sulpice (CH); Rolando Ferrini, Lausanne (CH); Libero Zuppiroli, Bonvillars (CH); Stéphane Suarez, Lausanne (CH); Roman Niklaus Marty, Lausanne (CH); Justin Gerard McMullen, Lausanne (CH); Michael Schär, Grandson (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 224 days.

(21) Appl. No.: 13/114,558

(22) Filed: May 24, 2011

(65) Prior Publication Data
US 2012/0301724 A1 Nov. 29, 2012

(51) Int. Cl.
*B05D 3/02* (2006.01)
*C09B 69/10* (2006.01)
*C09K 11/06* (2006.01)
*G02F 1/23* (2006.01)
*G02F 1/00* (2006.01)
*G02B 5/22* (2006.01)

(52) U.S. Cl.
CPC ............... *C09K 11/06* (2013.01); *C09B 69/101* (2013.01); *B05D 3/02* (2013.01); *G02F 1/0063* (2013.01); *G02B 5/223* (2013.01); *G02B 2207/113* (2013.01)
USPC ........ 428/411.1; 428/500; 359/321; 427/164; 427/385.5; 427/407.1

(58) Field of Classification Search
None
See application file for complete search history.

(56) References Cited

U.S. PATENT DOCUMENTS

| 6,080,516 A * | 6/2000 | Devlin et al. ................... 430/17 |
| 2004/0024151 A1* | 2/2004 | Becker et al. ................. 526/217 |
| 2010/0033947 A1* | 2/2010 | Lin et al. ........................ 362/84 |

FOREIGN PATENT DOCUMENTS

| EP | 1 843 407 | 10/2007 |
| JP | 2004362910 A * | 12/2004 |
| WO | WO 99/16847 | 4/1999 |
| WO | WO 02/066483 | 8/2002 |
| WO | WO 2008/063609 | 5/2008 |
| WO | WO 2009/135822 | 11/2009 |
| WO | WO 2011/052719 | 5/2011 |

OTHER PUBLICATIONS

Machine translation of JP 2004-362910 A, Dec. 2004.*
International Search Report mailed Oct. 5, 2012 issued in PCT International Patent Application No. PCT/IB2012/052577, 4 pp.
Written Opinion mailed Oct. 5, 2012 issued in PCT International Patent Application No. PCT/IB2012/052577, 5 pp.

* cited by examiner

*Primary Examiner* — Ramsey Zacharia
(74) *Attorney, Agent, or Firm* — Nixon & Vanderhye, PC

(57) ABSTRACT

The present invention concerns a color conversion film comprising at least one active layer, said layer comprising an organic fluorescent dye containing a fluorescent core, wherein said dye is substituted with at least one polymer segment. It also concerns its method of preparation.

21 Claims, 3 Drawing Sheets

COLOR CONVERSION FILMS COMPRISING POLYMER-SUBSTITUTED ORGANIC FLUORESCENT DYES

FIELD OF THE INVENTION

The present invention relates to a color conversion film and a process for its preparation. It more particularly relates to a color conversion film comprising an active layer, said active layer comprising a polymer-substituted organic fluorescent dye.

STATE OF THE ART

Fluorescent inorganic and organic materials are used in several applications in a broad range of disciplines such as life science, chemistry, biochemistry, biology, physical-chemistry, physics, optics, photonics and lighting. Fluorescent dyes and (nano)pigments are developed for biological detection, (bio-) labeling, tracing, tagging and imaging, where their advantages with respect to more classical markers are the high quantum yield, the large color availability, the good photo-stability, the large surface-to-volume ratio, the surface functionality, and the small size (X. Michalet et al., *Single Mol.* 2001, 4, 261; G. Calzaferri et al., *Angew. Chem. Int. Ed.* 2003, 42, 3732; P. Sharma et al., Adv. Colloid Interface Sci. 2006, 123-126, 471; L. Zhao et al., *Chem. Phys. Lett.* 2006, 420, 480; R. Kinderman et al., *J. Sol. Energy Eng.* 2007, 129, 277; R. Asakura et al., *Jpn. J. Appl. Phys.* 2007, 46, 5193; W. Chen, *J. Nanosci. Nanotechnol.* 2008, 8, 1019; P. Uthirakumar et al., *J. Lumin.* 2008, 128, 287). Fluorescent nanoparticles are also used to produce functional pigments and inks, as well as fluorescent materials for light-harvesting and lighting applications (J. Schneider et al., *Microporous Mesoporous Mater.* 2000, 39, 257; N. Tessler et al., *Science* 2002, 295, 1506; C. Sanchez et al., *Adv. Mater.* 2003, 15, 1969; I. Gourevich et al., *Chem. Mater.* 2004, 16, 1472; G. Calzaferri et al., *Proc. SPIE* 2006, 6192, 619216-1; S. Suárez et al., *Adv. Funct. Mater.* 2007, 17, 2298). Fluorescent emitters are dispersed either onto or into films and foils to fabricate fluorescent layers used in security tags, where, for instance, the ultraviolet light, invisible to the human eye, is converted into visible light (electromagnetic irradiation with wavelengths between 400 and 800 nm), thus making such markers visible only under illumination with an ultraviolet source. Fluorescent layers are also used to modify the emission spectrum (the color) of luminescent/phosphorescent panels used for signalization purposes. Fluorescent foils are eventually exploited in food production to convert either sunlight or artificial light into a different lighting, thus modifying the environmental illumination in order to, for instance, accelerate plant growth.

Fluorescent materials are particularly used as light conversion emitters to modify the spectral response of light sources. Light conversion fluorescent compounds convert part of the light absorbed in a certain energy interval to radiate it at larger wavelengths. This approach is used to fabricate or modify light sources that emit in the visible spectral range (light wavelengths between 400 and 800 nm). These latter sources are used in lighting devices that produce visible light, for instance, for the illumination of internal or external spaces, advertising and security panels, as well as for the background lighting of LCD screens and mobile phone displays. Examples of such lighting devices are fluorescent tubes, fluorescent compact lamps, or ultraviolet-based white light emitting diodes (*Multi-Year Program Plan FY '09-FY '15—Solid-State Lighting Research and Development*, US Department of Energy, March 2009: http://www1.eere.energy.gov/buildings/ssl/techroadmaps.html), where the ultraviolet radiation, invisible to the human eye, is converted by fluorescent materials (phosphors) into visible light with a spectral distribution between 400 and 800 nm. The light conversion emitters are directly dispersed either onto the inner surface of the fluorescent tube/lamp or into the plastic encapsulating dome of the light emitting diode. For such devices, only inorganic phosphors are used as conversion dyes, and the corresponding conversion layers must completely absorb UV light and, at the same time, be opaque to visible light due to strong scattering, in order to efficiently scatter visible light out of the lighting device.

Inorganic phosphors are also used in white-light emitting diodes based on blue emitters, where they are dispersed inside the plastic capsule covering the semiconductor device to partially convert its original blue radiation into a yellow-green light that, combined with the remaining blue light from the irradiation source, yields an overall white emission (Patent application WO 2006/127030). For such applications, which demand a very high thermal and photochemical stability of the phosphors, three families of inorganic dyes are used:
  i) YAG (Yttrium Aluminum Garnet) phosphors that cover the yellow spectral range (around 560 nm) and are especially suitable for high-power and high-stability applications (Patent applications JP11243232A and JP2005146172A).
  ii) BOSE (Ba—Sr—Ca-orthosilicates doped with Eu) phosphors that can be chemically adapted to cover the 505-610 nm range but have a limited efficacy at high temperature (Patent application US2010155761A1).
  iii) Nitride phosphors that emit in the red spectral range higher than 610 nm but have stability issues (Patent applications EP1433831A1, EP2264762A2, JP2003277746A, and US20080089825).

Other fluorescent inorganic compounds used for lighting applications are, for instance, nanophosphors and quantum dots, (C. Connolly, *Europhotonics*, 2009, 12) but they do not offer either the efficiency, durability, nor the competitive cost demanded by the lighting devices. Moreover, only few phosphor combinations are possible in the specific case of white-light emitting diodes based on blue emitters, since their emission range is narrow and the number of available phosphors is limited. The combined emission of the phosphors typically does not cover uniformly the visible spectral range, which reduces the possibility of mimicking the emission spectrum of sunlight or incandescent sources and, consequently, the color rendering performance of the lighting device.

In order to circumvent the lighting quality and the color rendering issues, organic fluorescent dyes have been developed, which give access to both a large number of available molecules and to the possibility of easily tuning their emission spectra by molecular engineering. Perylene and naphtalene derivatives, for instance, have been synthetized as highly efficient and highly stable fluorescent molecules (e.g., Lumogen™ by BASF SE, Germany, patent applications EP0422474 and DE354500; also EP0728745). Despite their promising emission properties, such organic dyes often suffer from a lack of the required long-term thermal and chemical stability when submitted to the severe physical-chemical conditions encountered in most lighting devices. In order to increase the photostability, modified fluorophores have been developed by combining organic dyes with ultraviolet absorbers or other stabilizing groups (V. Bojinov et al., *Dyes and Pigments.* 2007, 74, 551). Moreover, methods have been developed to modify fluorescent molecules such as perylene-based dyes in order to prevent aggregation and, thus, fluorescence quenching (Patent application WO01/92420-A2).

Besides the use of simple organic dyes, functionalizing fluorescent organic molecules with one or more attached organic groups is exploited to synthetize highly stable fluorescent macromolecules that provide better physical-chemical properties such as longer lifetimes and higher quantum yields (Patent applications JP8302227A, KR20080103338A, and US2009/0095200-A1). In particular, thermoplastic fluorescent pigments with improved solvent resistance have been obtained in this way that are suitable for dying different materials including plastics as well as paints, inks and textiles (Patent application WO03/006557-A1): Moreover, organic dyes like perylene-based compounds have been functionalized with organic groups in order to prepare dye monomers and analogous polymers that allow for the fabrication of fluorescent media such as films, coatings, foils, micro- and nanoparticles (Patent applications WO02/14414-A2, WO02/066483-A1, and WO02/066563-A1). For instance, perylene-imide-based polymer derivatives have been investigated as materials for optoelectronic applications (Patent applications WO2009/098250-A1, and WO2011045309).

An alternative approach to improve both the emission performances and the durability of organic fluorescent dyes is their encapsulation into either inorganic or organic hosts, which allows for the synthesis of a large palette of fluorescent materials. In particular, both organic-inorganic (G. Schulz-Ekloff et al., *Microporous Mesoporous Mater.* 2002, 51, 91; S. Suárez et al., *Adv. Funct. Mater.* 2007, 17, 2298; E. Johansson et al., *J. Sol-Gel Sci. Technol.* 2008, 46, 313) and organic-organic (F. Tronc et al., *J. Polym. Sci., Part A: Polym. Chem.* 2003, 41, 766; T. Tamai et al., *J. Polym. Sci., Part A: Polym. Chem.* 2008, 46, 1470; Z. Hu et al., *Opt. Mater.* 2008, 30, 851) host-guest systems have been developed for the chemical, photo-chemical or thermal stabilization and the supramolecular organization of organic fluorescent dye molecules, complexes and clusters (M. L. Cano et al., *J. Chem. Soc. Chem. Commun.* 1995, 24, 2477; H. García et al., *J. Phys. Chem.* 1996, 100, 18158; M. Pauchard et al., *Chem. Eur. J.* 2000, 6, 3456; H. Gao et al., *Colloid Polym. Sci.* 2002, 280, 653; M. Takasu et al., *Colloid Polym. Sci.* 2004, 282, 740; K. Ando et al., *J. Colloid Interface Sci.* 2005, 285, 619). The most common examples of such systems are:

i) Nanoporous zeolites (O. Nicolet et al., *Adv. Funct. Mater.* 2009, 19, 1877; R. Ferrini et al., *J. Appl. Phys.* 2010, 107, 114323; M. A. Keane, *Opt. Mater.* 1998, 138, 11; A. Corma et al., *J. Inorg. Chem.* 2004, 1143; G. Calzaferri et al., *Angew. Chem. Int. Ed.* 2003, 42, 3732; M. Pauchard et al., *Chem. Eur. J.* 2000, 6, 3456; D. Brühwiler et al., *Microporous Mesoporous Mater.* 2004, 72, 1; U. Vietze et al., *Phys. Rev. Lett.* 1998, 81, 4628; I. Braun et al., *Appl. Phys. B* 2000, 70, 335; Ö. Weiss et al., *J. Solid State Chem.* 2002, 167, 302; M. L. Cano et al., *J. Chem. Soc. Chem. Commun.* 1995, 24, 2477; H. García et al., *J. Phys. Chem.* 1996, 100, 18158): In addition to their widespread commercial use as catalysts and ion-exchangers, zeolites have been used as hosts for the encapsulation of different organic molecules. Due to the limited space available in the zeolite channels, aggregation, dimer formation or unsolicited bimolecular reactions are inhibited and very high concentrations of dye molecules are obtained. In particular, different organic molecules have been encapsulated into zeolite L nanocrystals, enabling the fabrication of new types of fluorescent pigments. Thus, a large variety of colors can be obtained by exploiting the energy transfer between two or more combined fluorescent dyes. Moreover, the high concentration of fluorescent dyes and the anisotropic arrangement of their dipole moments in the zeolite hosts have led to the fabrication of interesting lasing materials. It has also been demonstrated that, by organizing cationic fluorescent molecules in the linear channels of zeolite nanocrystals, an artificial antenna system for light harvesting and fast anisotropic transport can be realized. Finally, infiltrating organic dyes into the channels of zeolites can protect them against chemical attack, photo-bleaching or thermal decomposition.

ii) Mesoporous silica particles (C-Y. Mou et al., *Pure Appl. Chem.* 2000, 72, 137; I. Sokolov et al., *Small* 2007, 3, 419; M. Ganschow et al., *Angew. Chem.* 2000, 112, 167; T. Martin et al., *Angew. Chem. Int. Ed.* 2002, 41, 2590): Dye-doped mesoporous silica particles have been synthesized that contain closed channels which prevent the leakage of the encapsulated molecules. Among the different mesoporous silica hosts, MCM-41 has been extensively studied in regard of its morphological structure and the possibility of adjusting both the pore size and the chemical structure of the particle surface.

iii) Silica nanoparticles (X. Zhao et al., *Adv. Mater.* 2004, 16, 173; M. Montalti et al., *Langmuir* 2004, 20, 2989; J. Fölling et al., *Small* 2008, 4, 134; W. Stöber et al., *J. Colloid Interface Sci.* 1968, 26, 62; A. P. Philipse et al., *J. Colloid Interface Sci.* 1989, 128, 121): Once loaded with fluorescent organic dyes, silica nanoparticles possess interesting physical-chemical and photo-chemical properties such as strong fluorescence, excellent photo-stability, photo-tunability, internal energy transfer, easy surface modification, size uniformity and tunability.

iv) Organic-organic supramolecular complexes (W. R. Bergmark et al., *J. Phys. Chem.* 1990, 94, 5020; J. Mohanty et al., *Angew. Chem. Int. Ed.* 2005, 44, 3750): Supramolecular complexes have been developed using organic macromolecules such as cyclodextrins and cucurbiturils to encapsulate small organic molecules or ions. With respect to the fluorescent dye in solution, these water-soluble complexes have improved physical-chemical properties, including higher quantum yield, better photostability, inhibition of unspecific molecule adsorption and dye aggregation.

v) Fluorescent polymer nanoparticles: Different approaches have been developed to synthetize organic fluorescent particles. For instance, post-synthesis swelling of polymer particles by organic dye solutions or microemulsion polymerization in the presence of dye molecules have been used to load poly(methyl methacrylate) nanoparticles with organic fluorescent dyes (Patent applications WO963664, and EP692517A1). In order to prevent the molecule migration inside the nanoparticles, which eventually limits the pigment efficiency and durability, the dye molecules can be functionalized to be covalently linked to the polymer backbone in the course of the polymerization process (Patent application US2004063889A1). The pigment durability can be further improved both by appropriately choosing the polymer mixture and by adding photo-stabilizers and similar additives such as ultraviolet-absorbers, anti-oxidants and HALS compounds (T. Matsumoto et al., *J. Am. Ceram. Soc.* 2005, 88, 3458; D. Leppard et al., *Chimia* 2002, 56, 216). More complex nanoparticles have also been synthesized by combining different functional molecules; thus, for example, photo-switchable fluorescent nanohybrids have been obtained by embedding intermolecularly hybridized photochromes and fluorescent dyes into polymer nanoparticles (R. Ferrini et al., *J. Appl. Phys.* 2010, 107, 114323; M. Antonietti et al., *Macromol. Chem. Phys.* 2003, 204, 207; H. Gao et al., Colloid Polym. Sci. 2002, 280, 653; K. Ando et al., *J. Colloid Interface Sci.* 2005, 285, 619; P. Uthirakumar et al., *J. Lumin.* 2008, 128, 287; R. Asakura et al., *Jpn. J. Appl. Phys.* 2007, 46, 5193; M. Takasu et al., *Colloid Polym. Sci.* 2004, 282, 740; R. Kinderman, *J. Sol. Energy Eng.* 2007, 129, 277; C. Norakankorn et al., *Macromol. Rapid Commun.* 2007, 28, 1029; A. D. Dinsmore et al., *Appl. Opt.* 2001, 40, 4152; B-K. An, *J. Am. Chem. Soc.* 2002, 124, 14410; F. Tronc et al., *J. Polym. Sci., Part A: Polym. Chem.* 2003, 41, 766; T. Tamai et al., *J. Polym. Sci., Part A: Polym. Chem.* 2008, 46, 1470; Z. Hu et al., *Opt. Mater.* 2008, 30, 851 and for example http://www.neomark.com.tw/index.html). Both hydrophobic and thermoplastic polymers have been used to produce fluorescent micro- and nano-particles (Patent applications WO00/26290 and US20100301285A1). More specifically, functionalized rylene dyes such as perylene and terrylene diimide derivatives have been subjected to a thermal emulsion polymerization to yield shape-persistent, water-soluble fluorescent nanoparticles (T. T. Andrew et al., *Macromolecules* 2011, 44, 2276). Aqueous emulsions have also been used to prepare fluorescent dye-doped water polymer nanoparticle dispersions (Patent applications EP1801127-A1, DE102006020190-A1, US2005/0075453-A1 and US2006/0252881-A1). In particular, emulsifying an aqueous surfactant solution and an organic solution of a monomer and an organic chromophore has been applied to form micelles of the monomer and the chromophore inside a surfactant shell that have been eventually polymerized (Patent application WO2009/134822-A2).

Besides the development of fluorescent organic particles and pigments, embedding organic fluorescent dyes and pigments in a polymer matrix has been used to obtain highly efficient and stable fluorescent materials. Most organic fluorescent dyes such as perylene, rhodamine, coumarine, and naphthalimide compounds present an improved efficiency and photo-stability when dispersed into polymer coatings like low-density polyethylene (LDPE), poly(vinyl chloride) (PVC), poly(vinylidene fluoride) (PVDF), and poly(methyl methacrylate) (PMMA) (I. Baumberg et al., *Polymer degradation and stability* 2001, 73, 403; R. Kinderman et al., *J. Sol. Energy Engineering* 2007, 277; L. R. Wilson et al., *Appl. Optics* 2009, 48, 212; M. Fikry et al., *J. Fluoresc.* 2009, 19, 741; A. Kurian et al., *Laser Chem.* 2002, 20, 99; R. Ferrini et al., *J. Appl. Phys.* 2010, 107, 114323).

Polymer layers doped with organic dyes appear to be the ideal platform for the development of color conversion films for lighting applications. Differently from standard color filters that absorb or reflect certain spectral components of the impinging light beam, such conversion films contain one or more conversion dyes or pigments, which absorb part of the light emitted by a given light source to actively convert it by re-emission at different wavelengths. With the use of efficient color conversion layers, both the color rendering and the lighting quality of a white light illumination device can be improved by filling the gaps in its spectral response in order to mimic the emission of either sunlight or incandescent sources (R. Ferrini, *Bulletin d'Electrosuisse SEV/AES* 2010, 6, 37). Moreover, once an illumination system is equipped with a color conversion film, the latest advances in the lighting device can be easily implemented, without changing the luminous flux, the driver, and the dimensions of the overall lighting module. Therefore, improvements in the lighting technology can be automatically translated into a reduced power consumption of the module. This represents stability for the lighting device manufacturers, and reassures the lighting designers that such systems will remain available for their projects in years to come, in contrast to standard lighting devices where the constant evolution in performance requires a frequent redesign of the illumination system for given luminous flux or color rendering specifications.

In order for the conversion films to be efficient, both the fluorescence conversion and the light extraction from the polymer layers must be optimized.

On one hand, the excitation of the conversion dyes or pigments as well as the re-emission mechanisms have to be highly efficient. On the other hand, since the excited emitters are internal light sources embedded into a polymer matrix with a refractive index larger than 1 (the refractive index of air), most (typically about 80%) of the converted light remains trapped inside the organic layers due to total internal reflection. Therefore, the ratio between the emitted and absorbed light quantity (external fluorescence efficiency) needs to be optimized in addition to the excitation and the conversion efficiencies, in order to obtain efficient color conversion films.

Inorganic phosphors have also extensively been used in "remote" conversion layers (C. Hoelen et al., Proc. SPIE 2008, 7058, 70580M-1 (Fortimo® by Philips, U.S. Pat. No. 6,234,648B1; furthermore, patent applications WO2005/111171-A1, WO2005/071010-A1, JP11-199781, and US2007/0031685), where the lack of physical contact between the conversion dye and the light-emitting device helps to overcome a few drawbacks of the standard phosphor-doped encapsulation. Thus, the emitters in such a setup are incorporated into a film and placed far away from the region with the highest excitation energy density (the emission focus). As a result, the local heating due to the Stokes loss in the phosphor conversion process is reduced, increasing both the emitter efficiency and its durability. Moreover, the optical decoupling of the emitting devices from the color conversion elements provides a greater flexibility in the optimization of the light out-coupling than standard compact packages, resulting in high lighting efficacies. However, since standard inorganic phosphors have particle sizes in the micrometer range, the resulting conversion layers are opaque and strongly scatter the visible light when these phosphors are embedded into the otherwise transparent polymer matrix, both because of the refraction index mismatch between the particles and the polymer and because of the particle size (larger than the wavelengths of visible light). This hinders considerably or even prevents the separate control of the absorption and the emission processes by the conversion dyes. As a result, even though the used phosphors have often very high quantum yields, the external efficiency of the conversion layers is negatively affected, because a large amount of the converted light cannot escape from the conversion film, is scattered and eventually reabsorbed, or is radiated in an undesired direction. Further issues arise when several different conversion dyes are used. Since the light propagation inside a conversion layer depends on the wavelength range, the optical properties of the films should be adjusted to the used phosphors. Moreover, both the light absorption by the different dyes and the reciprocal conversion effect on the emitted radiation need to be carefully controlled. This is usually achieved using multilayer systems, where the optical properties of each layer containing a single conversion emitter may be selectively optimized (Patent applications EP1480278, and WO2006/114077). Nevertheless, the control of both the optical properties and the light out-coupling in such multilayer films doped with inorganic phosphors, is again limited by strong light scattering. The scattering issue may be tackled by using polymers with a high refraction index, such as polyimide, in order to match the refractive index of the inorganic phosphors (Patent application WO2005/100016). Although almost transparent layers can be fabricated in this way, the obtained layers consist of both micrometer-size regions incorporating the emitters and undoped zones of similar sizes because the distribution of the conversion phosphors in the film is linked to the particle size. This leads to a very inhomogeneous absorption and emission. Alternatively, it is possible to prepare inorganic nanophosphors with particle sizes well below 400 nm (Patent application WO2005/051846). In this case, the particles are small with respect to the visible wavelengths so that light scattering may be considerably reduced and almost transparent conversion films may be obtained. On the other hand, the obtained films will still exhibit issues in regard of the lighting quality and the color rendering, as a consequence of the limited number of available inorganic phosphors and their narrow emission ranges.

In this respect, the use of organic fluorescent dyes instead of inorganic phosphors as conversion emitters presents several advantages. By using organic fluorescent dyes, it is not only possible to solve the latter issues but, due to the almost perfect refractive index match with polymers, transparent conversion layers may be prepared (Patent application EP1422282). However, when a moderate or even negligible light scattering is achieved, the problem of the light extraction becomes very important because most of the converted light stays trapped inside the polymer layer and is mainly radiated laterally out of the film facets instead of being emitted out of the film surface as required for lighting applications. Several strategies can be used to partially suppress the lateral radiation so to improve the surface light out-coupling: for example, the deposition of optically matched polymer layers (polymer-based anti-reflection coatings) (G. Wicht et al., *Macromol. Mater. Eng.* 2010, 295, 7960; W. Joo et al., *Langmuir* 2006, 22, 7960; M. Zhao et al., *J. Opt. Soc. Am. B* 2005, 22, 1330; S. Walheim et al., *Science* 1999, 283, 520; J. Cho et al., *J. Am. Chem. Soc.* 2006, 128, 9935; K. Biswas et al., *Thin Solid Films* 2006, 514, 350; M. S. Park et al., *Chem. Mater.* 2005, 17, 3944; J. Hiller et al., *Nature Mater.* 2002, 1, 59; S. Kim, *Langmuir* 2007, 23, 6737, and patent applications EP1492389-A1 or US2008/113213-A1, EP08164280.3 or US2010/0102251-A1, EP1022587-A1, US20060074172, US20060099407, and EP1492389), the structuring of the film surface (H. Jiang et al., *Opt. Lett.* 2007, 32, 575; S. E. Yancey et al., *J. Appl. Phys.* 2006, 99, 034313; Y. K. Ee et al., *Appl. Phys. Lett.* 2007, 91, 221107, and SPIE Proc. 2009, 7321, 72310U-7, and patent application WO2005/100016. See also for example: http://www.nittoeurope.com), and, if necessary, the targeted use of inorganic scatterers such as $SiO_2$, $TiO_2$, AlOOH or other oxide nanoparticles.

GENERAL DESCRIPTION OF THE INVENTION

We have found that the use of a polymer-substituted organic fluorescent dye unexpectedly improves both the efficiency of a color conversion film and its durability.

The invention provides a color conversion film comprising at least one active layer, said layer comprising an organic fluorescent dye containing a fluorescent core, wherein said dye is substituted with at least one polymer segment.

The invention provides a color conversion film, wherein the polymer segment described above is selected from the group consisting of poly(styrene), poly(methyl methacrylate), poly(butyl methacrylate), poly(butyl acrylate), poly(isoprene), poly(butadiene), hydrogenated poly(isoprene), poly(cyclooctene), poly(tetrafluoroethylene) and its copolymers, or poly(isobutylene).

The invention provides a color conversion film, wherein the fluorescent core is selected from the group consisting of naphthalenes, perylenes, terrylenes, quaterrylenes, and which is optionally monosubstituted or polysubstituted.

The organic fluorescent may furthermore comprise a linking group between the fluorescent core and the polymer, said linking group being selected in the group consisting of imide, amide, ester, amine or an heteroatom O. A spacer group may also be present between the polymer and the linking group and/or between the fluorescent core and the linking group.

In accordance with a particular embodiment of the invention, the preferred compounds are indicated below:

Compound 1

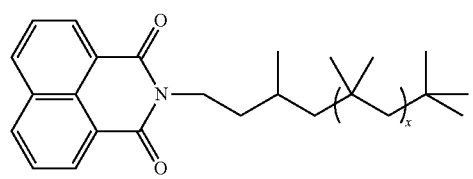

Compound 2

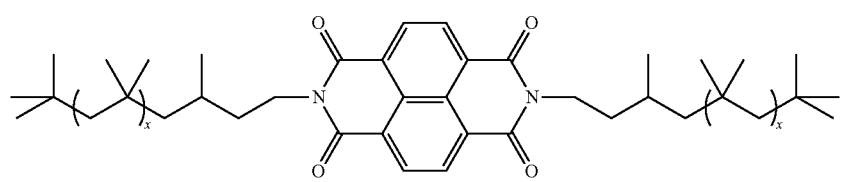

Compound 3

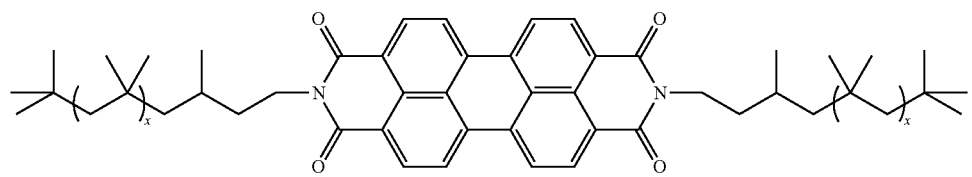

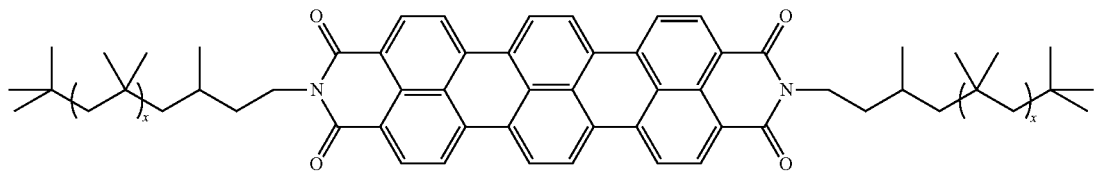

Compound 4

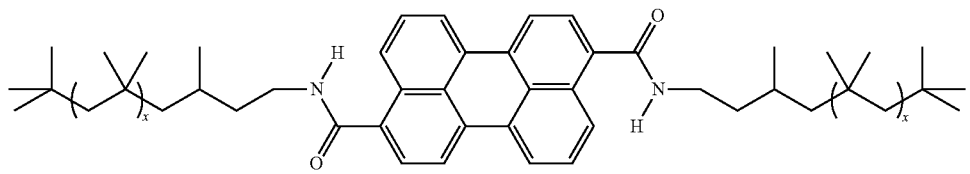

Compound 5

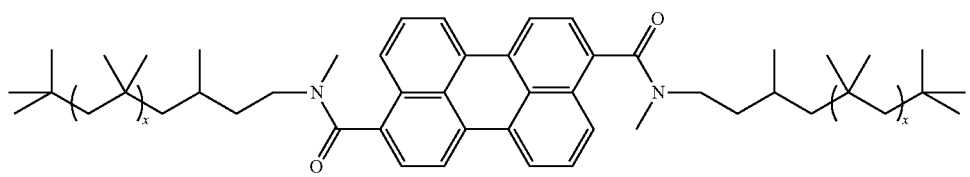

Compound 6

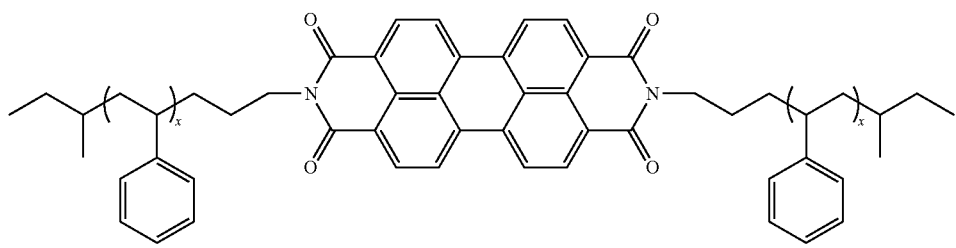

Compound 7 with x representing the average degree of polymerization of the attached polymers, which is an integer of 10 to 50.

The active layer of the color conversion film according to the invention may comprise several sub-layers.

Each of said sub-layer may be obtained from a solution of one type of the dyes described above.

Each of said sub-layer may be obtained from a colloidal dispersion of one type of the dyes described above.

The invention provides a color conversion film, wherein the active layer is obtained from at least one solution of the dye described above or one colloidal dispersion of the dye described above.

The colloidal dispersion described above may furthermore comprise water, a polar solvent, a surfactant, a hydrophobic polymer, a hydrophilic polymer, a moderately polar cosolvent and an unpolar cosolvent.

The colloidal dispersion may be formed from a mixture of dispersions of one type of said dyes.

The colloidal dispersion may be formed from the mixture of several dispersions formed from several types of said dyes or from one type of said dyes.

The invention provides a color conversion film, wherein the colloidal dispersion of the dye as described is prepared by a method comprising:
(i) providing a first solution of surfactant and the hydrophilic polymer in a mixture of water and solvent;
(ii) providing a second solution of the dye as described and the hydrophobic polymer in a mixture of the moderately polar cosolvent and the unpolar cosolvent;
(iii) adding the second solution to the first solution;
(iv) subjecting the mixture to a strong agitation and/or sonication.

The invention provides a color conversion film, wherein the colloidal dispersion of the mixture of colloidal dispersions of several types of the dyes as described is prepared by a method comprising:
(i) providing a first solution of surfactant and the hydrophilic polymer in a mixture of water and solvent;
(ii) providing a second solution of at least two different types of the dyes as described and the hydrophobic polymer in a mixture of the moderately polar cosolvent and the unpolar cosolvent;
(iii) adding the second solution to the first solution;
(iv) subjecting the mixture to a strong agitation and/or sonication.

The invention provides a color conversion film, wherein the mixture of several colloidal dispersions formed from one type of said dyes or several types of said dyes is obtained by the mixing of at least two of the colloidal dispersions of one type of said dye or at least two of the colloidal dispersions of a mixture of several types of said dyes.

The color conversion film according to the invention may comprise:
a flexible transparent substrate
at least one active layer as defined above,
at least one optical in-coupling layer
at least one encapsulation layer
at least one optical out-coupling layer.

Another object of the invention is to provide a process for preparation of the color conversion film according to the invention comprising the following steps:
(i) providing a flexible transparent substrate,
(ii) applying at least one active layer of a dye as described above by coating, and optionally (iii) applying at least one optical in-coupling layer by coating,
(iv) applying at least one encapsulation layer by coating,
(v) applying at least one optical out-coupling layer by coating.

Preferably, the active layer is obtained following a process which comprises a step of preparing a solution or a colloidal dispersion.

Other objects, features and advantages of the present invention will be apparent when the detailed description of the preferred embodiments of the invention are considered with reference to the figures which should be construed in an illustrative and not limiting sense as follows.

DETAILED DESCRIPTION OF THE INVENTION

In the following, the present invention will be described in detail using figures and examples.

Figure 1:
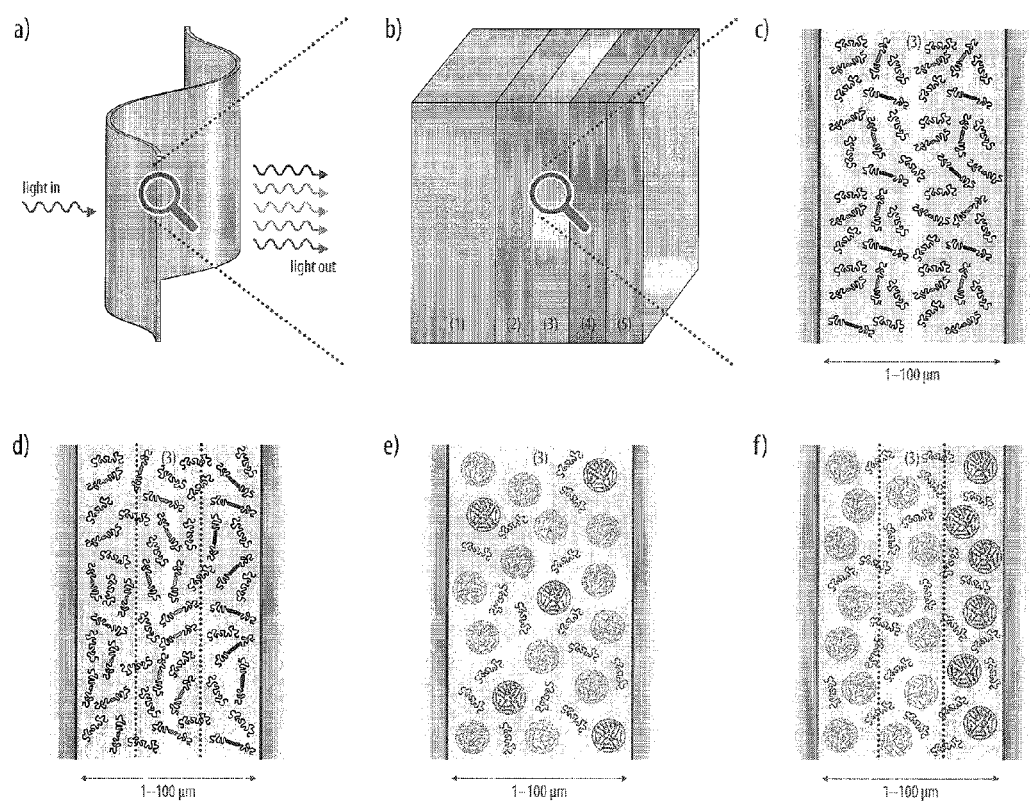
FIG. 1a is a schematic representation of the working principle of a color conversion film according to the invention.
FIG. 1b is a schematic illustration of one possible architecture of a color conversion film according to the invention (layers not drawn to scale): (1) transparent substrate H, (2) optical in-coupling layer I, (3) active layer G, (4) encapsulation layer K, (5) optical out-coupling layer J.
FIG. 1c-f are schematic representations of the composition of the active layer G according to the invention. These figures show some of the different possibilities of combining different polymer-substituted fluorescent dyes with different absorption and emission profiles in the active layer G, either in molecularly dispersed form or in the form of pigments obtained from the dispersions.

FIG. 1a is a schematic representation of the working principle of a transparent polymer color conversion film according to the invention, converting the narrow emission of a light source, such as a blue light inorganic light-emitting diode, into white light with a continuous emission spectrum covering most or all of the visible range of the spectrum (or, generally speaking, into light of a given color temperature and color rendering index).

The color conversion film according to the invention may be a free-standing fim or a film deposited on a transparent substrate H.

FIG. 1b shows one possible architecture of a color conversion film according to the invention:
(1) one transparent substrate H that serves to provide sufficient mechanical properties to the films as required by their field of application,
(2) one optical in-coupling layer I that provides a refractive index matching between the air and the substrate and, if necessary, a moderate light scattering, in order to reduce reflection losses at the interface and improve the excitation of the color conversion emitters,
(3) one active layer G or two or more of such active layers G containing the polymer-substituted fluorescent dyes according to the invention,
(4) one encapsulation layer K serving to sufficiently protect the active layer from air (oxygen), water (moisture), or other detrimental contaminants and reactants, as required by the field of application,
(5) one optical out-coupling layer J that provides a refractive index matching between the air and the substrate and, if necessary, a moderate light scattering or coherent diffraction by surface structuring, in order to improve the light out-coupling of the color converted radiation.

In this example, the color conversion film is composed of the following layers: H, I, G, K, J, successively. However, the film may be composed of these layers in another different order, and several layers G, I, J, K may be present in the film. For example, another possible order of the layers may be: H, I, G, J, K, successively; H, K, I, G, K, J, successively; H, I, K, G, K, J, successively; successively; H, K, I, G, J, K, successively; or H, I, K, G, j, K, successively.

The different layers of the films, namely the transparent substrate H, in-coupling layer I, out-coupling layer J, and encapsulation layer(s) K, and finally the active layer G itself (as well as the components making up the latter) will be further specified in the following.

Transparent Substrate H

The transparent substrate H is chosen to be a flat solid substrate made from a transparent or semitransparent polymer, organic, or inorganic material that serves to provide mechanical properties to the obtained films as required by the field application, including but not limited to glass, indium tin oxide (ITO), poly(styrene), poly(methyl methacrylate), poly (amide)s (Nylons), poly(ester)s such as poly(ethylene terepthalate), poly(butylene terephthalate), poly(isobutylene), poly(tetrafluoroethylene).

Preferably, the solid transparent substrate is chosen to be glass or poly(ethylene terepthalate) or poly(isobutylene) or poly(tetrafluoroethylene). In this latter case, the support layer can also be removed after deposition of the film, in order to obtain free-standing films without a solid support layer.

Optical In-Coupling Layer I

The optical in-coupling layer is composed of nanoporous inorganic to create low refractive index material and refractive index gradient.

Optical Out-Layer J

The optical out-coupling layer is composed of inorganic nanoparticles to create high refractive index material and refractive index gradient.

Encapsulation Layer K

The encapsulation layer is made from a transparent or semitransparent polymer, organic, or inorganic material that serves as a barrier layer that is impermeable to low molecular weight compounds such as oxygen, water, or other types of contaminants or reactants that can undergo photo-degradation reactions with the polymer-substituted fluorescent dyes according to the invention in the active layer, in particular, under radiative conditions. It, thus, serves as an additional protection of the polymer-substituted fluorescent dyes according to the invention in the active layer against degradation (bleaching) and will, in this way, increase the overall device life time. Materials for the encapsulation layer(s) include but are not limited to glass, indium tin oxide (ITO), poly(amide)s (Nylons), poly(isobutylene). In a preferred embodiment, the encapsulation layer is chosen to be glass. In an alternative preferred embodiment, the encapsulation layer is chosen to be poly(isobutylene).

Active Layer G

FIG. 1c-f illustrate some of possible compositions of the active layer G according to the invention.

Figure 2:
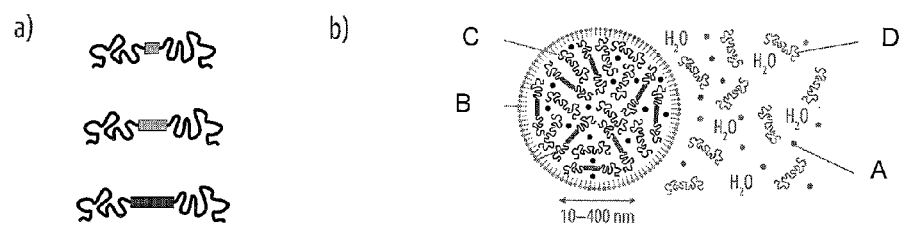
FIG. 2a is a schematic representation of three different polymer-substituted fluorescent dyes as described in this invention with different absorption and emission profiles (with increasing wavelengths in the order green, yellow, red).
FIG. 2b is a schematic and simplified illustration of the different components used to make up the dispersions of hydrophobic polymer particles ("pigments") containing one of the polymer-substituted fluorescent dyes according to the invention (as well as the matrix polymer C and the hydrophobic solvent F) phase-segregated from the hydrophilic environment constituted by water, polar solvent A, and the film-forming polymer D; the moderately polar solvent E is only used to prepare these dispersions.

According to a first embodiment, as shown on FIG. 1c, the active layer G contains a solution of different polymer-substituted fluorescent dyes according to the invention, using a matrix polymer C and the dye molecules themselves as the film-forming material. The polymer-substituted fluorescent dyes are represented by a rectangular shape to which two curly lines are attached (see enlargement on FIG. 2a). The rectangular shape represents the fluorescent core and the curly lines represent the polymer segment. The dyes have an increasing emission wavelength in the order blue, green, yellow, red, the code color being represented by different geometric shapes (i.e. an increasingly long rectangular shape) and shades of white, gray, and black. The matrix polymer C is represented by a black curly line (not attached to a rectangle).

According to a second embodiment, the active layer G comprises three sub-layers, as shown on FIG. 1d. These sub-layers are formed from solutions of different types of polymer-substituted organic fluorescent dyes. The first sub-layer contains a solution of one type of dyes (fluorescent core represented by a small rectangular shape), the second sub-layer contains a solution of another type of dyes (fluorescent core represented by a larger rectangular shape) and the third sub-layer contains a solution of a yet another type of dyes (fluorescent core represented by a even larger rectangular shape). These sub-layers are obtained by consecutive deposition from solution.

According to a third embodiment, FIG. 1e represents an active layer G containing a homogeneous mixture of different colloidal dispersions of one single type of dyes according to the invention (as in FIG. 4a), using a film-forming polymer D to obtain a mechanically stable film. The colloidal particles that form the dispersion are represented by circles inside of which are polymer-substituted organic fluorescent dyes. The different types of colloidal dispersions are represented by different shades of white, gray, and black. The film-forming polymers D, represented by gray curly lines (not attached to a rectangle), are outside of the circles representing the colloidal particles.

According to a fourth embodiment, FIG. 1f represents an active layer G with three sub-layers containing different colloidal dispersions obtained from different types of dyes according to the invention. The first sub-layer contains a colloidal dispersion of one type of dyes (light gray color), the second sub-layer contains a colloidal dispersion of a further type of dyes (darker gray compared to the color of the first sub-layer) and the third sub-layer contains a colloidal dispersion of a yet another type of dyes (even darker gray compared to the color of the first and second sublayers) These sub-layers are obtained by consecutive deposition of the dispersions.

As shown on FIG. 1c-f, the color conversion film according to the invention comprises at least one active layer, said layer comprising polymer-substituted organic fluorescent dye either in molecularly dispersed form or in the form of phase-segregated particles ("pigments"). These films may be obtained from either solutions of polymer-substituted fluorescent dyes in appropriate (organic) solvents or from their dispersions in polar media.

In the following, the invention will be explained in detail for the active layer used in the different embodiments, as well as its composition and the processes of manufacturing.

Polymer-Substituted Organic Fluorescent Dyes

The polymer-substituted organic fluorescent dyes according to the invention contains a fluorescent core ("fluorophor") F, said dye being substituted with at least one polymer segment P.

The polymer segment may be linked to the fluorescent core via a linking group X. A spacer group may also be present between the polymer and the linking group or between the fluorescent core and the linking group.

The attached polymer substituents are a decisive part of the invention because they (i) provide a hydrophobic environment for the fluorophor F to protect it from degradation reactions involving water or other polar reactants, (ii) allow the obtained polymer-substituted organic fluorescent dyes to form dispersions of dye-containing polymer particles in water or other polar media, (iii) provide an amorphous glassy or fluidic matrix in which the fluorophors F are embedded to suppress their aggregation and, thus, avoid the associated fluorescence quenching; and (iv) reduce the diffusion coefficients of the obtained macromolecular fluorescent dyes to prohibit their diffusion to the interface of the obtained polymer particles with the environment and thus suppress degradation reactions with water, oxygen, or other components in the surrounding media. For all of these reasons, it is also important that the fluorophor F is placed at the core of the obtained macromolecules (as opposed to attaching the fluorophor as the side chains of a polymer backbone as described previously) so that the attached polymer substituents P will efficiently shield the fluorophor F when they are in a random coil conformation.

The polymer-substituted organic fluorescent dyes, which can be used more preferably, may be a compound represented by the general formula (I):

(1)

The specific structures of the polymer substituents P, the linking group X and the fluorophor F as used in the polymer-substituted organic fluorescent dyes that are provided by this invention are further detailed below.

The polymer substituent P is a hydrophobic, amorphous polymer which is either glassy or a viscous liquid at room temperature (glass transition temperature above or below room temperature), including but not limited to poly(styrene), poly(methyl methacrylate), poly(butyl methacrylate), poly(butyl acrylate), poly(isoprene), poly(butadiene), hydrogenated poly(isoprene) (also known as poly(ethylene-co-butylene)), poly(cyclooctene), poly(tetrafluoroethylene) and its copolymers, or poly(isobutylene). Preferably, the polymer P is a hydrophobic amorphous polymer that is rubbery or a viscous liquid at room temperature (glass transition temperature below room temperature), including but not limited to poly(butyl acrylate), poly(isoprene), poly(butadiene), hydrogenated poly(isoprene) (also known as poly(ethylene-co-butylene)), or poly(isobutylene). More preferably, the polymer is poly(isobutylene) which is particularly advantageous for the preparation of color conversion films from dispersions of the obtained polymer-substituted organic fluorescent dyes because it is highly hydrophobic, amorphous, and fluidic, and it is known to provide good barrier properties for gases, polar reactants, and other low molecular weight reactants that may give rise to degradation of the fluorophors, in particular, under irradiation. In an alternative, particularly preferred embodiment, the polymer substituent P is a curable (cross-linkable) hydrophobic polymer that is rubbery or a viscous liquid at room temperature before curing (glass transition temperature below room temperature), including but not limited to poly (isoprene) or poly(butadiene); curing of the polymer substituents P in the final films will serve to completely immobilize the fluorophors F inside the polymer matrix.

The polymers P are typically synthesized by standard methods of living or controlled polymerization, including but not limited to anionic polymerization, controlled radical polymerization, such as atom-transfer radical polymerization (ATRP), nitroxide-mediated polymerization (NMRP, also known as stable free radical polymerization, SFRP), or reversible addition-fragmentation-transfer (RAFT) polymerization, as well as controlled cationic polymerization, ring-opening polymerization (ROP), or ring-opening metathesis polymerization (ROMP), so that the molecular weight range can be well controlled, the molecular weight distribution is narrow, and polymers with known and defined functional end groups as well as a high degree of end group functionalization are obtained. In an alternative approach, the polymers P are obtained by standard polymerization techniques, including but not limited to free radical polymerization or free cationic polymerization, provided that the aforementioned aspects concerning molecular weights, molecular weight distributions, and end group functionalization are fulfilled, e.g., as a result of purification techniques.

The molecular weights of the polymer P are chosen to (i) provide excellent solubility of the polymer-substituted organic fluorescent dyes in (hydrophobic, unpolar) organic solvents, (ii) provide good dispersability in polar media, (iii) give inherent film-forming properties to the polymer-substituted fluorescent dyes themselves, (iv) prevent the aggregation of the attached organic fluorophors but (v) also not to dilute the concentration of the fluorophors more than necessary, which would be disadvantageous for their application in color conversion films. The number-average molecular weights $M_n$ of the polymer P are typically in the range of $M_n=500\text{-}100'000$. Preferred are polymers P with a number-average molecular weight $M_n$ in the range of $M_n=500\text{-}10'000$, and particularly preferred are polymers P with a number-average molecular weight $M_n$ in the range $M_n=500\text{-}2'000$. The polydispersity indexes in the case of the preferred embodiments are PDI≤1.5. The polymers typically exhibit a degree of functionalization with the known and defined end groups of f>60%; preferred is a degree of functionalization of f>90%; particularly preferred are polymers with a degree of functionalization of f=97-100%.

The linking group X in the described polymer-substituted organic fluorescent dyes may be an amide group, an imide group, an ester group, an amine group, or an heteroatom O.

If X is an amide group, it may be a free amide group C(O)NH (that might promote an aggregation of the fluorophors via hydrogen bonding) but preferably a substituted amide function C(O)NR(R≠H) that specifically serves to prohibit aggregation of the fluorophors via either hydrogen bonding (of the amide group itself) or π-π stacking (of the fluorescent core) due to their steric demand and because they force the amide function to be non-coplanar with the aromatic system of the fluorophor. R may be an alkyl group such as a methyl.

The imide group is C(O)NC(O).

The ester group is C(O)O.

The amine group is NR where R may be H or an alkyl group such as methyl.

A spacer group may also be present between the polymer and the linking group and/or between the fluorescent core and the linking group. Thus the polymer will be connected to the fluorescent core via S1-X-S2 where S1 and S2 are spacers. Only one spacer may be present. These spacers are for example alkylene, substituted 1,4-phenylene.

In one embodiment, the number of polymer substituents n in the polymer-substituted organic fluorescent $(P—X—)_n—F$ may be n=1-6; a preferred number is n=1-3; a particularly preferred number is n=1 or n=2.

In one embodiment, the organic fluorophors F of the described polymer-substituted organic fluorescent dyes are chosen from known organic fluorophors that have appropriate functional groups to attach the polymers P (defined as "reactive fluorophors" in the following).

In a preferred embodiment, the reactive fluorophors are chosen from the family of rylene dyes, that is, with fluorescent cores F consisting of annulated benzene rings as in naphthalene, perylene, terrylene, quaterrylene, and the analogous higher members of the rylene family. These dyes are particularly advantageous for the preparation of color conversion films that is part of the present invention because of their known chemical and thermal stability, their highly efficient fluorescence, and the ease of chemical functionalization by standard coupling reactions. The chosen dyes include but are not limited 1-naphthalenecarboxylic acid and its derivatives, 1,4-naphthalenedicarboxylic acid and its derivatives, 1,5-naphthalenedicarboxylic acid and its derivatives, 1,8-naphthalenedicarboxylic acid and its derivatives (in particular anhydride), naphthalene-1,4,5,8-tetracarboxylic acid and its derivatives (in particular dianhydride), 3-perylenecarboxylic acid and its derivatives, 3,4-perylenedicarboxylic acid and its derivatives, 3,9-perylenedicarboxylic acid and its derivatives, 3,10-perylenedicarboxylic acid and its derivatives (in particular anhydride), perylene-3,4,9,10-tetracarboxylic acid and its derivatives (in particular dianhydride), 3-terrylenecarboxylic acid and its derivatives, 3,12-terrylenedicarboxylic acid and its derivatives, 3,11-terrylenedicarboxylic acid and its derivatives, 3,4-terrylenedicarboxylic acid and its derivatives (in particular anhydride), terrylene-3,4,11,12-tetracarboxylic acid and its derivatives (in particular dianhydride), 3-quaterrylenecarboxylic acid and its derivatives, 3,14-quaterrylenedicarboxylic acid and its derivatives, 3,13-quaterrylenedicarboxylic acid and its derivatives, 3,4-quaterrylenedicarboxylic acid and its derivatives (in particular anhydride), quaterrylene-3,4,13,14-tetracarboxylic acid and its derivatives (in particular dianhydride), as well as the analogous higher members of the rylene family of dyes. In a particularly preferred embodiment, the reactive fluorophors are 1,8-naphthalenedicarboxylic anhydride, naphthalene-1,4,5,8-tetracarboxylic dianhydride, perylene-3,4-dicarboxylic anhydride, perylene- 3,4,9,10-tetracarboxylic dianhydride, terrylene-3,4-dicarboxylic anhydride, and terrylene-3,4,11,12-tetracarboxylic dianhydride.

Preparation of Polymer-Substituted Organic Fluorescent Dyes

The described polymer-substituted organic fluorescent dyes are prepared in a "graft-to" approach, that is, by coupling the end-functionalized polymers to the reactive fluorophors. The employed "graft-to" method is advantageous to previously described methods of polymer-functionalization of organic fluorescent dyes by "graft-from" methods (that is, polymerization of appropriate monomers from fluorophors equipped with functional groups that serve as polymerization initiators) or by polymerizing fluorophors equipped with polymerizable groups so that the fluorophors are side groups to the polymer backbone. In comparison to the latter case, it is important that the fluorophor F is placed at the core of the obtained macromolecules (as opposed to attaching the fluorophor as the side chains of a polymer backbone so that the attached polymer substituents P will efficiently shield the fluorophor, as already explained above). Compared to "graft-from" approaches, the end-functionalized polymers are better defined, can be rigorously purified before the coupling, and thoroughly characterized with respect to their molecular structure, including molecular weights and molecular weight distributions. Moreover, also the obtained polymer-substituted organic fluorescent dyes can be straightforwardly purified from side products, incomplete reaction products, or unreacted starting materials because of their respective drastic differences in molecular structures, including molecular weights, and resulting physical properties. As a consequence, the obtained polymer-substituted organic fluorescent dyes are, likewise, better defined and less likely to contain contaminants resulting from the synthesis that will promote degradation reactions of the fluorophors when the dyes are applied in color conversion films. Furthermore, the straightforward, one-step synthesis from simple precursors (i.e., the end-functionalized polymers and the reactive fluorophors) is better suited to prepare a series of polymer-substituted organic fluorescent dyes that have different absorption and emission properties but are compatible with one another with respect to mixing, as required for the fabrication of color conversion films that will produce a broad emission profile with tunable color rendering index and color temperature.

A preferred method of preparation is the reaction of polymer amines P—$NH_2$ with a member of the family of reactive rylene dyes described above. A particularly preferred method of preparation is the reaction of amine-terminated poly(isobutylene) including but not limited to Kerocom™ PIBA (BASF SE, Germany; which contains approximately 60% w of amine-terminated poly(isobutylene) and 40% w of low molecular weight non-functionalized poly(isobutylene)) to rylene derivatives including but not limited to carboxylic acids, carboxylic acid derivatives, dicarboxylic acids, dicarboxylic acid derivatives (including but not limited to anhydrides), tetracarboxylic acids, tetracarboxylic acid derivatives (including but not limited to dianhydrides) of naphthalene, perylene, terrylene, and quaterrylene, as described above. An alternative particularly preferred method of preparation is the reaction of the same rylene derivatives to amine-terminated poly(styrene), poly(isoprene), or hydrogenated poly(isoprene) (also known as poly(ethylene-o-butylene), including but not limited to poly(styrene) or poly(isoprene) obtained by anionic polymerization started with organolithium compounds and quenching with 1-(3-bromopropyl)-2,2,5,5-tetramethyl-1-aza-2,5-disilacyclopentan, followed by aqueous work-up as well as, in the case of hydrogenated poly(isoprene), high-pressure hydrogenation. Another alternative, particularly preferred method of preparation is the coupling of the same rylene derivatives to amine-terminated poly(butyl acrylate) or poly(methyl methacrylate), including but not limited to poly(butyl acrylate) or poly(methyl methacrylate) obtained by controlled radical polymerization followed by functional group interconversion to the terminal amines.

Another preferred method of preparation is the reaction of the thus obtained amides or diamides dyes where R=H with alkylating agents such as methyl iodide (MeI) to obtain the corresponding dyes.

Composition of Dispersions of Polymer-Substituted Organic Fluorescent Dyes

The present invention provides compositions of and methods of preparation for stable dispersions of the polymer-substituted fluorescent dyes according to the invention, as well as dispersions of mixtures of these dyes.

The dispersions disclosed here provide the fluorescent dyes described above in a particularly advantageous form for the subsequent preparation of optical films (see below). Thus, the dyes are incorporated into hydrophobic polymer particles with typical particle diameters of a few dozens to a few hundreds of nanometers that are phase-segregated from the hydrophilic environment, so that the dyes are protected from degradation reactions and irradiative conditions, the particles do not scatter visible light, and light emitted by the dyes can be efficiently extracted from the dispersions (and the films obtained from them). The current invention has several additional key advantages as compared to the state of the art (namely incorporation in Zeolites or in PMMA nanoparticles). Most importantly, the proposed polymer-substituted fluorescent dyes, due to the attached hydrophobic polymers P, will spontaneously form aqueous dispersions in the presence of standard surfactants without an additional chemical reaction (such as an emulsion polymerization in the case of PMMA nanoparticles) or elaborate processing steps (such as incorporation into zeolites) being required. Moreover, the attached polymers serve to prohibit an interaction of the fluorescent cores as compared to standard organic fluorescent dyes (such as the related Lumogen™ dyes by BASF) and hence prevent fluorescence quenching, which allows to incorporate the fluorescent cores in significantly higher concentration (resulting in better color conversion in absolute terms) without affecting the quantum yield. Furthermore, the polymer substituents render the dyes highly soluble in unpolar or moderately polar organic solvents, making a processing of the fluorescent dyes at high concentrations and on the technical scale feasible and straightforward. Additionally, the diffusion of the polymer-substituted dyes to the interface with the hydrophilic environment is hindered, due to their high molecular weight that is a consequence of the polymer attachment. Finally, the absorption and emission profile of the obtained dispersions (as well as the films prepared thereof, see below) can be straightforwardly adapted to different light sources, and controlled and fine-tuned with respect to the targeted color temperature (tint) and color rendering index (quality) by simple changes in the composition of the dispersions, that is, the combination of different dyes in the preparation of the dispersions, or the combination of dispersions prepared separately from different dyes, or both.

The dispersions that are provided by this invention (see FIG. 2b) may be composed of:
(i) water or one or more polar solvents A, or a mixture of water and one or more of the solvents A;
(ii) one type of the polymer-substituted fluorescent dyes according to the invention, or a mixture of two or more types of these dyes in varying relative proportions;
(iii) a surfactant B or a mixture of such surfactants;
(iv) a hydrophobic matrix polymer C that is compatible (miscible) with the polymer-substituted fluorescent dyes according to the invention but immiscible with water or the polar solvent A or their mixtures;
(v) a hydrophilic film-forming polymer D that is miscible with water or the polar solvent A or their mixtures but immiscible with the polymer-substituted fluorescent dyes according to the invention;
(vi) a moderately polar cosolvent E that is both a solvent for the polymer-substituted fluorescent dyes according to the invention and miscible with water; and
(vii) an apolar cosolvent F that is a solvent for the applied polymer-substituted fluorescent dyes but immiscible with water.

The different components of the dispersions (solvent A, surfactant B, polymers C and D, cosolvents E and F) are further detailed below, before the description of the overall composition of the dispersions.

The cosolvent A is a water-miscible, polar solvent used to fine-tune the solubility/dispersability of the other components, including but not limited to alcohols, dimethylformamide (DMF), dimethalacetamide (DMAc), dimethylsulfoxide (DMSO), acetonitrile (MeCN). Preferably, the cosolvent A is an alcohol.

The surfactant B serves to disperse the components that are not miscible with water and obtain stable dispersions with controlled particle sizes in the range of a few dozens to a few hundreds of nanometers. In one embodiment of the dispersions, the surfactant B may be a cationic, anionic, zwitterionic, or neutral surfactant, including but not limited to such as alkyl ammonium salts, alkyl phosphates, alkyl sulfonates, alkyl sulfosuccinates, alkanoates, alkyl glycosides, sorbityl alkanoates, Brij surfactants (i.e., oligo(ethylene oxide) alkanoates), and polymer surfactants such as poly(vinyl alcohol), pluronics, or para-alkylphenoxypoly(glycidol) surfactants, such as para-isononylphenoxypoly(glycidol), also known as Olin 10G™. In a particularly preferred embodiment of the dispersions, the surfactant B is para-isononylphenoxypoly(glycidol), Olin 10G™. In an alternative particularly preferred embodiment of the dispersions, the surfactant B is poly(vinyl alcohol). The hydrophobic matrix polymer C is supposed to be compatible (miscible) with the polymer-substituted fluorescent dyes (i.e., the polymer substituents P of the fluorescent dyes) but immiscible with water or the polar solvent A or their mixtures, as it serves, on one side, to control and fine-tune the viscosity and mechanical stability of the phase-segregated, dye-containing polymer particles in the dispersions, and, on the other side, to "dilute" the polymer-substituted fluorescent dyes according to the invention incorporated inside the particles and, in this way, control and fine-tune their photophysical properties (in particular, inside the final optical films). Therefore, the matrix polymers C are polymers that are well-miscible with these polymer-substituted fluorescent dyes. Most straightforwardly, they are chosen to be the same type of polymers as the polymer substituents P of the fluorescent dyes themselves, but they can also be of a different type of polymer miscible with P, as well. In one embodiment, the matrix polymer C is chosen to be a single one or a mixture of viscous, rubbery, or glassy hydrophobic polymer(s), including but not limited to poly(styrene), poly (methyl methacrylate), poly(butyl methacrylate), poly(butyl acrylate), poly(isoprene), poly(butadiene), hydrogenated poly(isoprene) (also known as poly(ethylene-co-butylene)), poly(cyclooctene), poly(tetrafluoroethylene) and its copolymers, or poly(isobutylene). In a preferred embodiment, the matrix polymers are chosen to be a single one or a mixture of film-forming, thermoplastic hydrophobic polymer(s), including but not limited to poly(styrene), or poly(isobutylene). In an alternative preferred embodiment, the matrix polymer C is chosen to be a curable (cross-linkable) hydrophobic polymer, including but not limited to poly(isoprene), poly(butadiene), or butyl rubber (poly(isobutylene-co-isoprene)), that can be cross-linked after preparation of the final film. In a particularly preferred embodiment, the matrix polymer C is poly (isobutylene) which is particularly advantageous because it is highly hydrophobic, amorphous, and fluidic, and it is known to provide good barrier properties for gases, polar reactants, and other low molecular weight reactants that may give rise to degradation of the fluorophors, in particular, under irradiation.

The hydrophilic film-forming polymer D that serve to increase the viscosity of the dispersions, help disperse the hydrophobic components (in combination with the surfactant), control the size of the dye-containing polymer particles, increase the dispersions' stability, and, most importantly, to provide a mechanically stable hydrophilic polymer matrix into which the phase-segregated dye-containing polymer particles will be embedded in the final optical films (see below). In one embodiment, the film-forming polymers are chosen to be hydrophilic polymers that are miscible with (soluble in, and processable from) polar solvents (including but not limited to water, alcohols, dimethylformamide, dimethylsulfoxide, acetonitrile, tetrahydrofuran, or dioxane). In a preferred embodiment, the film-forming polymers are chosen to be water-soluble polymers, including but not limited to poly (vinyl alcohol), poly(acrylic acid), poly(methacrylic acid), poly(styrene sulfonate), poly(vinyl amine), poly(N-vinyl pyrrolidone), poly(alkylene imine)s, cellulose (and derivatives of cellulose). In a particularly preferred embodiment, the film-forming polymer is chosen to be poly(vinyl alcohol). In an alternative, particularly preferred embodiment, the film-forming polymer is chosen to be cellulose (or a derivative of cellulose).

The moderately polar cosolvent E is supposed to be both a solvent for the applied polymer-substituted fluorescent dyes according to the invention and miscible with water or solvent A or their mixtures, thus, helping in the process of dispersion formation. In one embodiment, the cosolvent A is a polar aprotic solvent, including but not limited to tetrahydrofuran (THF), dioxane, acetonitrile, dimethylformamide, dimethylsulfoxide, alcohols. Preferably, the cosolvent E is THF.

The apolar cosolvent F is supposed to be a solvent for the polymer-substituted fluorescent dyes according to the invention as well as the hydrophobic matrix polymers C, but immiscible with water or solvent A or their mixtures; the cosolvent F serves to tune the viscosity of the polymer particles during the process of dispersion formation in order to obtain more easily dispersible mixtures and more homogeneous particle sizes. In one embodiment, the cosolvent F is a preferably volatile unpolar solvent, including but not limited to aliphatic hydrocarbons (alkanes), aromatic hydrocarbons, haloalkanes (alkyl halides), esters (alkyl alkanoates), ketones, or ethers. Preferably, the cosolvent F is chosen to be either pentane, hexane, heptane, cyclohexane, benzene, toluene, methylene chloride, chloroform, tetrachlorocarbon, dichloroethane, trichloroethane, tetrachloroethane, trifluoroethane, tetrachloroethene, trichlorobenzene, ethyl acetate, propyl acetate, butyl propionate, ethyl propionate, propyl propionate, butyl propionate, butyl propionate, ethyl butyrate, propyl butyrate, butyl butyrate, cyclohexanone, methyl ethyl ketone (MEK), diethyl ether, dipropyl ether, diisopropyl ether, dibutyl ether, diisobutyl ether, or methyl tert-butyl ether (MTBE). More preferably, the cosolvent F is either pentane, hexane, heptane, methylene chloride, or chloroform.

In one embodiment, the dispersions are composed of water and a hydrophilic solvent A in relative ratios of 100:0-50:50, containing 0.01-5% w/w of one of the fluorescent dyes according to the invention, or a mixture of two or more the latter dyes in varying relative proportions, 0.01-5% w/w of the surfactant B, 0-10% w/w of the hydrophobic matrix polymer C, 0-30% w/w of the hydrophilic film-forming polymer D, 0-20% w/w of the moderately polar cosolvent E, as well as 0-20% w/w of the hydrophobic cosolvent F.

Figure 3:
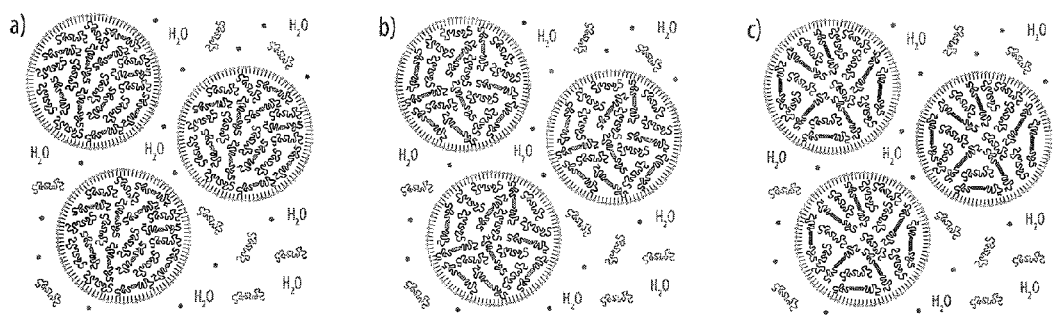
FIG. 3a-c illustrates three examples of dispersions of one type of polymer-substituted fluorescent dyes as described in this invention with different absorption and emission profiles (with increasing wavelengths in the order green, yellow, red).

In a particularly preferred embodiment (see FIG. 3a-c), the dispersions are composed of water and an alcohol as the hydrophilic solvent A in relative ratios of 100:0-90:10, containing 0.01-1% w/w of a single type of the polymer-substituted fluorescent dyes according to the invention, 0.01-1% w/w of Olin 10G™ as the surfactant B, 0-1% w/w of poly (isobutylene) as the hydrophobic matrix polymer C, 0-20% w/w of poly(vinyl alcohol) as the hydrophilic film-forming polymer D, 0-10% w/w of THF as the moderately polar cosolvent E, as well as 0-10% w/w of heptane as the hydrophobic cosolvent F.

In an alternative, particularly preferred embodiment, the dispersions are composed of water and an alcohol as the hydrophilic solvent A in relative ratios of 100:0-90:10, containing 0.01-1% w/w of a homogeneous mixture of two or more of the polymer-substituted fluorescent dyes in varying proportions, 0.01-1% w/w of Olin 10G™ as the surfactant B, 0-1% w/w of poly(isobutylene) as the hydrophobic matrix polymer C, 0-20% w/w of either poly(vinyl alcohol) or cellulose or a cellulose derivative as the hydrophilic film-forming polymer D, 0-10% w/w of THF as the moderately polar cosolvent E, as well as 0-10% w/w of heptane as the hydrophobic cosolvent F.

In another alternative, particularly preferred embodiment, the dispersions are composed of water and an alcohol as the hydrophilic solvent A in relative ratios of 100:0-90:10, containing 0.01-1% w/w of a phase-segregated mixture of two or more of the polymer-substituted fluorescent dyes in varying proportions, 0.01-1% w/w of Olin 10G™ as the surfactant B, 0-1% w/w of poly(isobutylene) as the hydrophobic matrix polymer C, 0-20% w/w of either poly(vinyl alcohol) or cellulose or a cellulose derivative as the hydrophilic film-forming polymer D, 0-10% w/w of THF as the moderately polar cosolvent E, as well as 0-10% w/w of heptane as the hydrophobic cosolvent F.

Preparation of Dispersions of Polymer-Substituted Organic Fluorescent Dyes

The additional components (solvent A, surfactant B, polymers C and D, cosolvents E and F) in combination with the chosen method of preparation as described below serve to obtain dispersions of the polymer-substituted fluorescent dyes that comprise dye-containing polymer particles with typical diameters in the range of 10-500 nm with a low polydispersity. In this range of particle sizes (below the wave length of visible light), the dispersions and final optical films will show minimal losses of the emitted light due to light scattering and allow for optimal light extraction (avoiding excessive self-absorption of the emitted light by the fluorescent dyes), even for materials (of the particles and the environment) the refractive indexes of which have not been specifically chosen to be matching, while still protecting the polymer-substituted fluorescent dyes incorporated into the particles from photo-degradation reactions that are promoted by a hydrophilic environment. The dispersions are to be stable (with respect to particle size and polydispersity as well as internal composition of particles) for at least 1 week (preferably 1 month) without sedimentation to occur. The dispersions have, therefore, been characterized by dynamic light scattering (DLS) to determine the particle size distribution, fluorescent microscopy to establish the luminescence of the particles, optical spectroscopy to measure the absorption and the fluorescence spectra, the energy transfer, and the quantum efficiency.

The aforementioned dispersions may be prepared by dissolving the surfactant B and the hydrophilic polymer D in a mixture of water and the polar solvent A. To this solution is then added a second solution containing the polymer-substituted fluorescent dyes according to the invention and the hydrophobic polymer C dissolved in a mixture of the moderately polar cosolvent E and the unpolar cosolvent F, under strong agitation by stirring, shaking, or ultrasonication. It is important to note that, in this way, dispersions can be made from single dyes, from mixtures of dyes, by mixing dispersions of single dyes, or by mixing dispersions of mixtures of dyes, all of which is part of the present invention as it serves to carefully control and fine-tune the photophysical properties of the thus obtained dispersions as well as the final optical films to be prepared from the latter (see below).

A preferred method of preparation is the addition of the polymer-substituted fluorescent dyes according to the invention dissolved in a mixture of solvents E and F to an ultrasonicated solution of the surfactant B and the hydrophilic polymer D in a mixture of water and the solvent A at temperatures between room temperature and 50° C., followed by extended ultrasonication of the resulting heterogeneous mixture.

A particularly preferred method of preparation is the addition of one type of the polymer-substituted fluorescent dyes according to the invention, dissolved in a mixture of THF and heptane to an ultrasonicated solution of the Olin 10G™ and poly(vinyl alcohol) in a mixture of water and an alcohol at room temperature, followed by extended ultrasonication of the resulting heterogeneous mixture.

Figure 4:
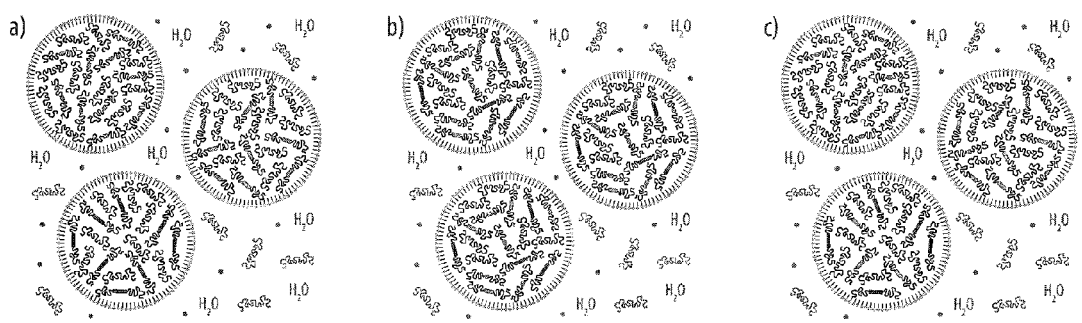
FIG. 4a-c is a schematic and simplified illustrations of some of the different possibilities of combining different polymer-substituted fluorescent dyes with different absorption and emission profiles; a) a mixture of separate dispersions of one type of polymer-substituted fluorescent dyes according to the invention; b) a single dispersion of a homogeneous mixture of several types of polymer-substituted fluorescent dyes according to the invention; c) a mixture of separate dispersions prepared from different mixtures of several types of polymer-substituted fluorescent dyes according to the invention.

An alternative, particularly preferred method of preparation is the addition of mixture of two or more of the polymer-substituted fluorescent dyes according to the invention, in varying proportions, dissolved in a mixture of THF and heptane to an ultrasonicated solution of the Olin 10G™ and poly(vinyl alcohol) in a mixture of water and an alcohol at room temperature, followed by extended ultrasonication of the resulting heterogeneous mixture. In this way, one obtains dispersions of mixtures of the dyes (FIG. 4b).

An alternative, particularly preferred method of preparation is the mixing of two or more of the dispersions (in varying proportions) obtained by one of the previous methods under stirring. In this way, one obtains mixtures of dispersions of individual dyes (FIG. 4a) or mixtures of dispersions of mixtures of dyes (FIG. 4c).

Composition of the Active Layer G

The active layer G (or one of the active layers G) of the film may be composed of:
 (i) the polymer-substituted fluorescent dyes according to the invention as the active components of the dye, as well as, optionally, one or more of the following components:
 (ii) one or several hydrophobic matrix polymer(s) C as defined above serving to fine-tune the concentration of the dyes inside the active layer as well as its mechanical and optical properties,
 (iii) one or several hydrophilic film-forming polymer(s) D as defined above serving to embed nanoparticles of the active components and the matrix polymers into a mechanically stable film,
 (iv) one or several organic components L serving to fine-tune the optical properties (e.g., absorption, emission) of the film,
 (v) one or several inorganic components M serving to fine-tune the optical properties of the film (e.g., refractive index).

The different components of the active layer, namely the active component(s) (i.e., the polymer-substituted fluorescent dyes according to the invention), the matrix polymer(s) C, the film-forming polymer(s) D, the organic component(s) L, and the inorganic component(s) M will be further detailed in the following.

The matrix polymer(s) C serve to dilute and fine-tune the concentration of the dyes inside the active layer (in order to avoid fluorescence quenching) as well as control its mechanical and optical properties. Therefore, they are polymers that are well-miscible with the polymer-substituted fluorescent dyes according to the invention. Most straightforwardly, they are chosen to be the same type of polymers as the polymer substituents P of the fluorescent dyes themselves, but they can also be of a different type of polymer miscible with P, as well. For example, the matrix polymers are chosen to be a single one or a mixture of hydrophobic polymer(s), including but not limited to poly(styrene), poly(methyl methacrylate), poly(butyl methacrylate), poly(butyl acrylate), poly(isoprene), poly(butadiene), hydrogenated poly(isoprene) (also known as poly(ethylene-co-butylene)), poly(cyclooctene), poly(tetrafluoroethylene) and its copolymers, or poly(isobutylene). Preferably, the matrix polymers are chosen to be a single one or a mixture of film-forming, thermoplastic hydrophobic polymer(s), including but not limited to poly(styrene), or poly(isobutylene). In an alternative preferred embodiment, the matrix polymers are chosen to be curable (cross-linkable) hydrophobic polymers, including but not limited to poly(isoprene), poly(butadiene), or butyl rubber (poly(isobutylene-co-isoprene)), that can be cross-linked after preparation of the final film. More preferably, the matrix polymer is poly(isobutylene) which is particularly advantageous because it is highly hydrophobic, amorphous, and fluidic, and it is known to provide good barrier properties for gases, polar reactants, and other low molecular weight reactants that may give rise to degradation of the fluorophors, in particular, under irradiation.

The film-forming polymers D serve to embed particles (obtained from dispersions) of the polymer-substituted fluorescent dyes according to the invention and the matrix polymers as defined above into mechanically stable films in which the dye-containing particles remain phase-segregated. For example, the film-forming polymers are chosen to be hydrophilic polymers that are miscible with (soluble in, and processable from) polar solvents (including but not limited to water, alcohols, dimethylformamide, dimethylsulfoxide, acetonitrile, tetrahydrofuran, or dioxane). Preferably, the film-forming polymers are chosen to be water-soluble polymers, including but not limited to poly(vinyl alcohol), poly(acrylic acid), poly(methacrylic acid), poly(styrene sulfonate), poly(vinyl amine), poly(N-vinyl pyrrolidone), poly(alkylene imine)s, cellulose (and derivatives of cellulose). In a particularly preferred embodiment, the film-forming polymer is chosen to be poly(vinyl alcohol). In an alternative, particularly preferred embodiment, the film-forming polymer is chosen to be cellulose (or a derivative of cellulose).

The organic components L are chosen to be low molecular weight chromophors or fluorophors that serve to fine-tune the optical properties of the films, e.g., as sensitizers or as absorption filters to protect the polymer-substituted fluorescent dyes in the active layer from photo-degradation reaction.

The inorganic components M are chosen to be inorganic nanoparticles, such as titania or silica that serve to modify refractive index. They have no negative impact on life time of the dyes.

Finally, the active component(s) of the active layer(s) are either one type of the polymer-substituted fluorescent dyes according to the invention, or a combination (mixture) of two or more types of these dyes (serving to control and tune the overall color conversion, color temperature, and color rendering index); these dyes are either molecularly dispersed in the active layer (as obtained from solutions of the dyes) or incorporated in the form of phase-segregated particles with typical diameters in the range of several dozens to several hundreds of nanometers (as obtained from the dispersions described in the previous section); the dyes are either homogeneously distributed throughout the film profile of the active layer, or they display a gradient in concentration and/or composition throughout the film profile.

The active layer may be composed of a molecularly dispersed single one or a mixture of two or more of the polymer-substituted fluorescent dyes according to the invention, as the active component in 20-100% w/w; the matrix polymer in 0-80% w/w; the organic component in 0-10% w/w, and the inorganic component in 0-20% w/w, with an overall thickness of the active layer in the range of 1-1000 μm. Preferably, a mixture of three or more of the polymer-substituted fluorescent dyes in their preferred embodiments (compounds 1-7), are applied as the active component in 50-100% w/w; the matrix polymer in 0-50% w/w; the organic component in 0-10% w/w, and the inorganic component in 0-10% w/w, with an overall thickness of the active layer in the range of 1-100 μm. Preferably, the matrix polymer used is poly(isobutylene) and the thickness of the active layer is in the range of 5-50 μm.

In an alternative embodiment, the active layer is subdivided into two or more sub-layers (e.g., obtained by consecutive deposition of different active layers), each one of which has the structure and properties as defined above. As a consequence, the overall resulting active layer exhibits a gradient in concentrations and compositions of the dyes throughout its profile.

In a preferred form of this embodiment, the active layer is composed of three or more sub-layers, each of which is composed of one type of polymer-substituted fluorescent dye according to the invention, as the active component in 50-100% w/w; the matrix polymer in 0-50% w/w; the organic component in 0-10% w/w, and the inorganic component in 0-10% w/w, with a thickness of the individual sub-layers in the range of 1-50 μm.

In a particularly preferred form of this latter preferred embodiment, the active layer is composed of three or more sub-layers, the order of which is such that the incorporated polymer-substituted fluorescent dyes in their preferred embodiments (compounds 1-7) are "sorted" according to increasing absorption and emission wavelengths, the matrix polymer in 0-50% w/w is poly(isobutylene) in all sub-layers, and the thickness of the individual sub-layers is in the range of 5-30 μm.

In a third alternative embodiment, the active layer contains the active component in the form of (hydrophobic) particles ("pigments", obtained from dispersion; composed of one or more of the dyes as well as the hydrophobic matrix polymer C) that are phase-segregated from the bulk of the film (made-up by the hydrophilic film-forming polymer D).

In a preferred form of this embodiment, the active layer is composed of particles of a single one or a homogeneous mixture of two or more of the polymer-substituted fluorescent dyes according to the invention, as the "active component" in 5-50% w/w; the matrix polymer C in 0-50% w/w; the film-forming polymer D in 0-95% w/w; the organic component in 0-10% w/w, and the inorganic component in 0-20% w/w, with an overall thickness of the active layer in the range of 1-1000 μm.

In a preferred form of this embodiment, a mixture of three or more of the polymer-substituted fluorescent dyes in their preferred embodiments (compounds 1-7), homogenously incorporated into the phase-segregated particles, are applied as the active component in 5-25% w/w; the matrix polymer in 0-25% w/w; the film-forming polymer D in 50-90% w/w; the organic component in 0-5% w/w, and the inorganic component in 0-5% w/w, with an overall thickness of the active layer in the range of 1-100 p.m. Preferably, the matrix polymer C is poly(isobutylene), the film-forming polymer D used is poly(vinyl alcohol), and the thickness of the active layer is in the range of 5-50 μm.

In a fourth alternative embodiment, the active layer G contains the active component in the form of (hydrophobic) particles ("pigments", obtained from dispersion; composed of one or more of the dyes as well as the hydrophobic matrix polymer C) that are phase-segregated from the bulk of the film (made-up by the hydrophilic film-forming polymer D) as in the case above. However, in this case different dispersions of either single polymer-substituted fluorescent dyes according to the invention, or their mixtures, are mixed in different proportions, in order to control and fine-tune the photophysical properties of the obtained films in the final processing step, i.e., the preparation of the films themselves. This allows to straightforwardly adapt the photophysical properties (color rendering index, color temperature, etc.) to different requirements and use cases.

In an alternative embodiment, the active layer is subdivided into two or more sub-layers, each one of which contains the active component in the form of (hydrophobic) particles ("pigments", obtained from dispersion; composed of one or more of the dyes as well as the hydrophobic matrix polymer C) that are phase-segregated from the bulk of the film (made-up by the hydrophilic film-forming polymer D) as in the case above. As a consequence, the overall resulting active layer exhibits a gradient in concentrations and compositions of the dyes throughout its profile. This allows to not only straightforwardly adapt the photophysical properties (color rendering index, color temperature, etc.) to different requirements and use cases, as in the previous case, but also to conveniently adapt and optimize the process of film fabrication accordingly.

Methods of Preparation for Color Conversion Films from Polymer-Substituted Organic Fluorescent Dyes According to the Invention.

In a first embodiment of the invention, the active layer G comprising a solution or colloidal dispersion of the polymer-substituted fluorescent dyes according to the invention is first applied to the transparent substrate H. The substrate H may then be removed to obtain a free-standing film.

To produce these films, a variety of standard methods may be used, such as dip-coating, drop-casting, spin-coating, roll-to-roll coating, coating using a Meyer bar (manually operated or automated), mechanical compression using a hydraulic press, or film extrusion.

A preferred method of film preparation is using a Meyer bar. The ease of processing, compatibility with industrial methods, uniformity in film thickness, and facile control of film thickness and film production rate are the key strengths of this method.

An alternative preferred method of film preparation is spin-coating. Due to the fine control of film thickness obtained when extremely thin films are desired (ranging from several dozen to thousands of nanometers thick), uniformity in film thickness, and tendency to produce defect-free films, spin-coating is an attractive preparation method.

Another alternative preferred method of film preparation is drop-casting. In particular for films prepared from solutions of organic solvents, drop casting is valuable because it allows for fabrication of films with substrates, but also free-standing films by deposition onto "non-wetting" surfaces followed by mechanical separation of the film and substrate. Drop-casting is limited in that only a single film layer may be efficiently deposited, though that layer may include a single dye or multiple dyes.

Another alternative preferred method of film preparation utilizes a hydraulic platen press. The benefits of this method are the ease of preparation, relatively fast film production, compatibility with dispersion and solution based dye preparation, robust tolerance for heterogeneity in starting materials, as well as a noteworthy insensitivity to solvent contamination in the starting materials.

Another alternative preferred method of film preparation is extrusion. The benefits to the extrusion method are its compatibility industrial methods, rapid film production rate, uniformity in film thickness, and ease of preparation of multi-layer films. This method remains most valuable for solution-based film preparation, but may be applicable to dispersion-based film preparation as well.

Only a single layer of solution of a single dye or of a mixture of dyes may be deposited on the substrate.

Several consecutive depositions of solutions of single dyes or solutions of mixtures of dyes may be applied on the substrate.

One deposition of a dispersion of a single dye or a dispersion of a mixture of dyes or a mixture of dispersions of single dyes or a mixture of dispersions of mixtures of dyes may be applied on the substrate.

Several consecutive depositions of single dispersions of single dyes, of mixed dispersions of single dyes, of single dispersions of mixtures of dyes, of mixed dispersions of mixtures of dyes may be applied on the substrate.

The present invention will now be described in detailed by way of Examples. The following examples are intended to be merely illustrative of the present invention, and not limiting thereof in either scope or spirit.

EXAMPLES

Preparation of the Polymer-Substituted Organic Fluorescent Dyes According to the Invention Preparation of Compound 1

N-poly(isobutylene)-1,8-naphthalenedicarboxylic acid imide

Purification of Poly(isobutylene)Amine (PIB$_{19}$—NH$_2$)

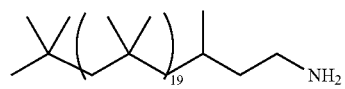

Commercially available Kerocom® (BASF) contains approximately 60 w % PIB—NH$_2$ and 40 w % low molecular weight non-functionalized PIB. Kerocom® (50 g, 41.4 mmol, 1 eq) was dissolved in DCM (500 mL) and silica gel (250 mL) was added. The DCM was removed in vacuo and the resulting powder dry-loaded onto a slurry of silica gel (1000 mL) and DCM in a big glass filter frit (12 cm diameter, 24 cm height). The non-functionalized PIB was eluted with DCM. Then, 5:1 DCM:MeOH solution was used to elute the amine-terminated PIB. The solvent was removed, resulting in thick white gel, which was redissolved in DCM. The solution was filtered to remove silica gel before removing DCM in vacuo to yield the title compound as a slightly yellow, sticky transparent oil (28.6 g, 23.5 mmol, 57%). $^1$H NMR (400 MHz, CDCl$_3$) δ 2.89-2.60 (m, 2H, H$_2$N—CH$_2$—PIB), 1.72-1.61 (m, 2H, H$_2$N—CH$_2$—CH$_2$—PIB), 1.61-0.68 (m, 176H, PIB aliphatic H).

Synthesis of Compound 1

N-poly(isobutylene)-1,8-naphthalenedicarboxylic acid imide

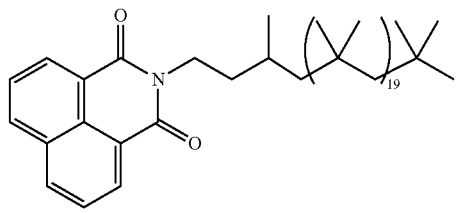

1,8-Naphthalenedicarboxylic anhydride (1.00 g, 5.0 mmol, 1 eq), PIB$_{19}$—NH$_2$ (6.85 g, 5.5 mmol, 1.1 eq), and Zn(OAc)$_2$ (471 mg, 2.5 mmol, 0.5 eq) were placed in a 250 mL Schlenk flask which was then evacuated and flushed with argon. Freshly distilled quinoline (100 mL) was added, and the reaction mixture was stirred for 12 h at 160° C. Most of the quinoline was removed in vacuo (at about 1.0·10$^{-3}$ mbar, 120° C.), and the residue was dissolved in DCM and washed with 1 M aq. HCl (2×). The organic phase was dried over MgSO$_4$ and evaporated. The crude material was purified by flash column chromatography (SiO$_2$; DCM) to give the title compound as a slightly brown, transparent sticky oil (6.57 g, 4.7 mmol, 94%). $^1$H NMR (400 MHz, CDCl$_3$) δ 8.60 (dd, J=7.1, 0.8 Hz, 2H, NMI aromatic H), 8.27-8.16 (m, 2H, NMI aromatic H), 7.87-7.69 (m, 2H, NMI aromatic H), 4.26-4.13 (m, 2H, NMI-N—CH$_2$—PIB), 1.78-1.66 (m, 2H, NMI-N—CH$_2$—CH$_2$—PIB), 1.64-0.79 (m, 194H, PIB aliphatic H).

Preparation of Compound 2

N,N'-Di(poly(isobutylene))-1,4,5,8-naphthalenetetra-carboxylic acid diimide

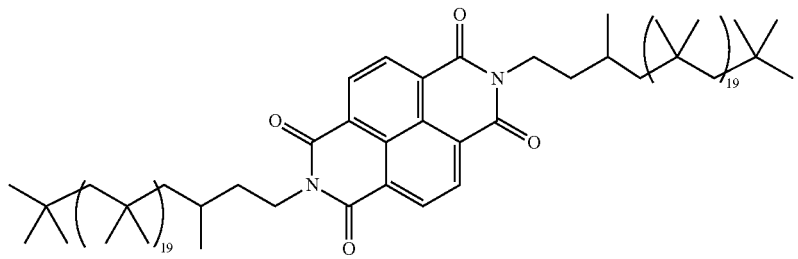

1,4,5,8-Naphthalenetetracarboxylic acid dianhydride (268 mg, 1.0 mmol, 1 eq), $PIB_{19}$—$NH_2$ (3.58 g, 3.0 mmol, 3 eq), and $Zn(OAc)_2$ (183 mg, 1.0 mmol, 1 eq) were placed in a 100 mL Schlenk flask which was then evacuated and flushed with argon. Freshly distilled quinoline (30 mL) was added, and the reaction mixture was stirred for 12 h at 160° C. Most of the quinoline was removed in vacuo (at about $1.0 \cdot 10^{-3}$ mbar, 120° C.), and the residue was dissolved in DCM and washed with 1 M aq. HCl (2×). The organic phase was dried over $MgSO_4$ and evaporated. The crude material was purified by flash column chromatography ($SiO_2$; DCM) to give the title compound as a slightly brown, transparent sticky oil (2.22 g, 0.8 mmol, 83%). $^1$H NMR (400 MHz, $CDCl_3$) δ8.75 (s, 4H, NBI aromatic H), 4.22-4.18 (m, 4H, NBI—N—$CH_2$—PIB), 1.85-1.65 (m, 4H, NBI—N—$CH_2$—$CH_2$—PIB), 1.48-0.85 (m, 361H, PIB aliphatic H).

Preparation of Compound 3

N,N'-Di(poly(isobutylene))-3,4,9,10-perylenetetra-carboxylic acid diimide

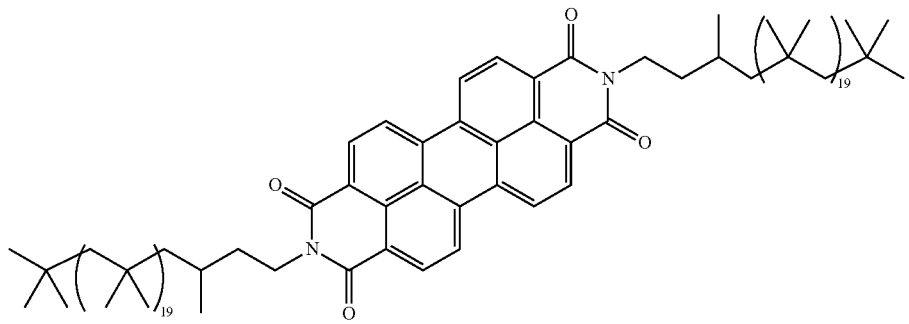

3,4,9,10-Perylenetetracarboxylic dianhydride (600 mg, 1.5 mmol, 1 eq), $PIB_{19}$—$NH_2$ (4.5 g, 3.7 mmol, 2.4 eq), and $Zn(OAc)_2$ (281 mg, 1.5 mmol, 1 eq) were placed in a 250 mL Schlenk flask which was then evacuated and flushed with argon. Freshly distilled quinoline (100 mL) was added, and the reaction mixture was stirred for 12 h at 160° C. Most of the quinoline was removed by distillation (at about $1.0 \cdot 10^{-3}$ mbar, 120° C.), and the residue was dissolved in DCM and washed with 1 M aq. HCl (2×). The organic phase was dried over $MgSO_4$ and evaporated. The crude material was purified by flash column chromatography ($SiO_2$; DCM) to give the title compound as a red, amorphous sticky solid (3.86 g, 1.4 mmol, 91%). $^1$H NMR (400 MHz, $CDCl_3$) δ 8.64 (d, J=7.7 Hz, 4H, PBI aromatic H), 8.55 (d, J=7.7 Hz, 4H, PBI aromatic H), 4.27-4.14 (m, 4H, PBI—N—CH$_2$—PIB), 1.84-1.66 (m, 4H, PIB—N—CH$_2$—CH$_2$—PIB), 1.64-0.72 (m, 338H, PIB aliphatic H).

Preparation of Compound 5

N,N'-Di(poly(isobutylene))-3,9-perylenedicarboxylic acid diamide

Potassium 3,9-perylene dicarboxylate

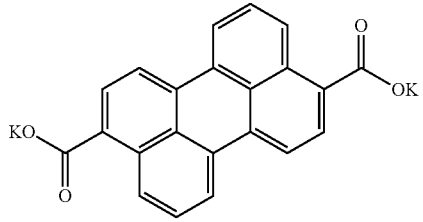

3,9-Perylenedicarboxylic acid diisobutyl ester (500 mg, 1.1 mmol, 1 eq) was suspended in 200 mL EtOH, and 1 M aq. KOH (7 mL, 3.3 mmol, 3 eq) was added. The reaction mixture was refluxed for 16 h. The precipitate was filtered off and washed with EtOH as well as DCM to provide the title compound as a yellow powder (369 mg, 0.9 mmol, 80%). $^1$H NMR (400 MHz, MeOD, 333K) δ 6.87-6.82 (m, 2H, PDA aromatic H), 6.76 (dd, J=9.7, 7.5 Hz 4H, PDA aromatic H), 6.17 (d, J=7.7 Hz 4H, PDA aromatic H), 5.99 (ddd, J=8.6, 7.6, 1.2 Hz 4H, PDA aromatic H). HRMS (ESI): calcd. mass for C$_{22}$H$_{11}$O$_4^-$: ([M−H]$^-$) 339.0663. found: 339.0653.

Synthesis of Compound 5

N,N'-Di(poly(isobutylene))-3,9-perylenedicarboxylic

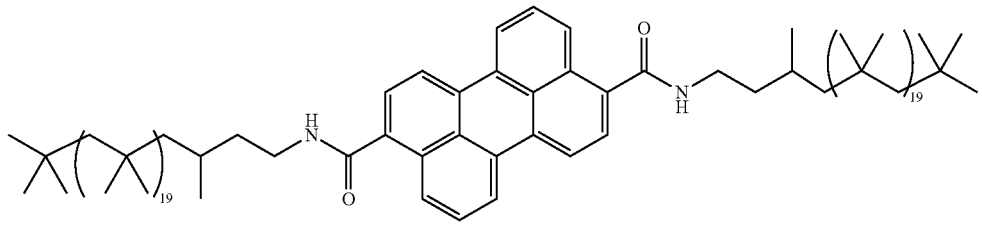

PIB$_{19}$—NH$_2$ (2.13 g, 1.8 mmol, 3 eq) was placed in a 250 mL round bottom flask and dissolved in THF (120 mL). Potassium-3,9-perylene dicarboxylate (250 mg, 0.6 mmol, 1 eq), DIEA (0.8 mL, 4.4 mmol, 7 eq), and PyBOP (938 mg, 1.8 mmol, 3 eq) were added in this order. The reaction mixture was stirred for 4 h at room temperature. Most of the THF was removed in vacuo, and the residue then precipitated in 1 M aq. HCl (three times). The obtained crude material was dissolved in DCM and most of the water was removed with a separatory funnel. The organic phase was dried over MgSO$_4$ and evaporated. The crude material was purified by flash column chromatography (SiO$_2$; DCM/MeOH 20:1) to give the title compound as an orange, transparent amorphous sticky solid (1.368 g, 0.5 mmol, 84%). $^1$H NMR (400 MHz, C$_2$D$_2$Cl$_4$, 333K) δ 8.27-8.20 (m, 4H, PDA aromatic H), 8.16-8.13 (m, 2H, PDA aromatic H), 7.61-7.56 (m, 4H, PDA aromatic H), 6.03-6.01 (m, 2H, CONH), 3.63-3.56 (m, 4H, CON—CH$_2$—PIB), 1.78-1.72 (m, 4H, CON—CH$_2$—CH$_2$—PIB), 1.64-0.79 (m, 376H, PIB aliphatic H).

Preparation of Compound 6

N,N'-Dimethyl-N,N'-di(poly(isobutylene))-3,9-perylenedicarboxylic acid diamide

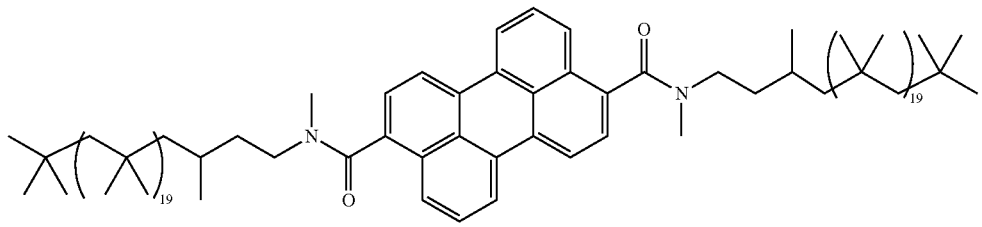

Sodium hydride (330 mg, 8.3 mmol, 5 eq) was placed in a 250 mL Schlenk flask that was evacuated and flushed with argon before dry THF (100 mL) was added. N,N'-Di(poly (isobutylene))-3,9-perylenedicarboxylic acid diamide (4.50 g, 1.6 mmol, 1 eq) dissolved in dry THF (100 mL) was slowly added to this suspension at 0° C. The resulting mixture was allowed to warm to room temperature and stirred for 30 min. Methyl iodide (0.6 mL, 9.9 mmol, 6 eq) was added, and the reaction mixture refluxed for 6 days. The reaction mixture was cooled to room temperature and washed with saturated aq. NH$_4$Cl. The organic phase was washed over MgSO$_4$ and evaporated. The crude material was purified by flash column chromatography (SiO$_2$; DCM/MeOH 100:1 to 10:1) to give the title compound as an orange-brown, transparent sticky oil (3.20 g, 1.2 mmol, 70%). $^1$H NMR (400 MHz, C$_2$D$_2$Cl$_4$, 333K) δ 8.26 (dd, J=16.7, 7.3 Hz, 2H, PDA aromatic H), 7.70 (dd, J=8.2, 3.9 Hz, 2H, PDA aromatic H), 7.58 (t, J=7.8 Hz, 2H, PDA aromatic H), 7.44 (d, J=7.5 Hz, 2H, PDA aromatic H), 3.79-2.86 (3×m, 10H, CONCH$_3$, CH$_2$NCH$_3$CO), 1.88-0.60 (m, 384H, PIB aliphatic H).

Preparation of Compound 7

N,N'-Di(poly(styrene))-3,4,9,10-perylenetetracarboxylic acid diimide

Synthesis of 1-(3-Bromopropyl)-2,2,5,5-tetramethyl-1-aza-2,5-didilacyclopentane

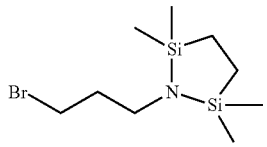

Following a modified literature procedure, 3-bromopropylamine hydrobromide (14.06 g, 64 mmol, 1 eq) was placed in a three-necked round bottom flask equipped with a 50 mL dropping funnel. The apparatus was evacuated and flushed with argon. The bromopropylamine hydrobromide was suspended in dry DCM (300 mL), and dry Et$_3$N (36 mL, 257 mmol, 4 eq) was added under vigorous stirring. The reaction mixture was cooled to 0° C., and 1,2-bis(chlorodimethylsilyl) ethane (13.9 g, 64 mmol, 1 eq) dissolved in dry DCM (70 mL) was slowly added via the dropping funnel. The reaction mixture was allowed to warm to room temperature and stirred for 3.5 h and then filtered through a glass filter frit. The filter residue was washed with dry DCM and then dried in vacuo. The residue was suspended in dry hexanes (500 mL) and the resulting slurry was stirred for 10 min before it was filtered off again through a glass filter frit. The filter residue was extracted with dry hexanes. The hexane solution was washed with 1 M aq. NaOH (2×200 mL), and brine (1×200 mL), then dried over MgSO$_4$ and evaporated to dryness in vacuo to give the title compound as a colorless liquid (17.45 g, 62 mmol, 97%). $^1$H NMR (400 MHz, CDCl$_3$) δ 3.40 (t, J=6.6 Hz, 2H, Br—CH$_2$), 2.96-2.91 (m, 2H, N—CH$_2$), 1.98-1.90 (m, 2H, Br—CH$_2$—CH$_2$—CH$_2$—N), 0.70 (s, 4H, (Si—CH$_2$—)$_2$), 0.06 (s, 12H, Si—(CH$_3$)$_2$).

Synthesis of Poly(styrene)Amine (PS$_{15}$—NH$_2$)

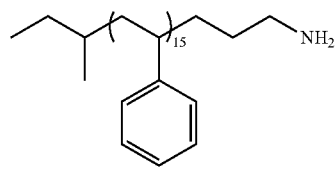

Following a modified literature procedure, styrene (13.5 mL, 117.5 mmol, 15 eq) was freshly distilled from CaH$_2$ prior to use. A pre-dried Schlenk flask was filled with dry cylcohexane (50 mL), and then sec-butyl lithium (5.5 mL, 7.8 mmol, 1 eq) was slowly added into the Schlenk flask at 6° C. Styrene was added to the system as fast as possible, and the reaction mixture was stirred for 1 h at this temperature before it was quenched by the addition of 1-(3-bromopropyl)-2,2,5,5-tetramethyl-1-aza-2,5-disilacyclopentane (5 mL, 19.5 mmol, 2.5 eq) previously dissolved in dry THF (20 mL). The reaction mixture was stirred for 2 h, and the solvent was then removed in vacuo. The residue was redissolved in THF (100 mL), 1 M aq. HCl (35 mL) was added, and the resulting mixture was stirred overnight. Most of the THF was removed in vacuo, and DCM (100 mL) was added. The solution was washed twice with 1 M aq. KOH, and once with brine, and dried over MgSO$_4$. The crude product was purified by silica gel column chromatography (SiO$_2$; DCM to DCM/MeOH 20:1) to give the title product as a slightly yellow solid. (9.2 g, 5.5 mmol, 70%). $^1$H NMR (400 MHz, CDCl$_3$) δ 7.013-6.32 (m, 79H, PS aromatic H), 2.56-2.42 (m, 2H, H$_2$N—CH$_2$—PS), 2.39-0.54 (m, 65H, PS aliphatic H). HRMS (ESI-TOF): calcd. mass for C$_{127}$H$_{138}$N$^+$: ([M+H]$^+$) 1677.0824. found 1677.9187.

Synthesis of Compound 7

N,N'-Di(poly(styrene))-3,4,9,10-perylenetetracarboxylic acid diimide

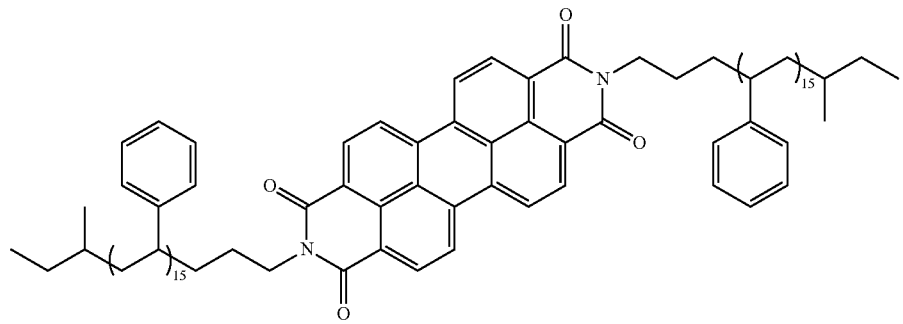

3,4,9,10-Perylenetetracarboxylic dianhydride (30 mg, 76.5 μmol, 1 eq), $PS_{15}$—$NH_2$ (310 mg, 183.5 μmol, 2.4 eq), and $Zn(OAc)_2$ (15 mg, 76.5 μmol, 1 eq) were placed in a 50 mL Schlenk-flask which was then evacuated and flushed with argon. Freshly distilled quinoline (20 mL) was added, and the reaction mixture was stirred for 12 h at 160° C. Most of the quinoline was removed by distillation (at about $1.0 \cdot 10^{-3}$ mbar, 120° C.), and the residue was dissolved in DCM and washed with 1 M aq. HCl (two times). The organic phase was dried over $MgSO_4$ and evaporated. The crude material was dissolved in DCM and precipitated in MeOH before it was purified by flash column chromatography ($SiO_2$; DCM) to give the title compound as a red solid (249 mg, 67.1 μmol, 88%). $^1$H NMR (400 MHz, $CDCl_3$) δ 8.65-8.58 (m, 4H, PBI aromatic H), 8.55-8.49 (m, 4H, PBI aromatic H), 7.25-6.35 (m, 167H, PS aromatic H), 4.13-3.96 (m, 4H, PBI—N—$CH_2$—PS), 2.52-0.54 (m, 133H, PS aliphatic H). HRMS (MALDI): calcd. mass for $C_{278}H_{280}N_2O_4Ag^+$: $([M+Ag]^+)$ 3819.0886. found 3819.4993.

Preparation of the Colloidal Dispersions According to the Invention

Preparation of Dilution Series of the Polymer-Substituted Organic Fluorescent Dyes According to the Invention Compound 2, Dilution Series
Compound 2 (66.3 mg) was dissolved in TCE (25 mL) to prepare a stock solution. From this stock solution, a series of dilutions was prepared to give samples with concentrations ranging from $1.0 \cdot 10^{-6}$ mol/L to $1.0 \cdot 10^{-3}$ mol/L.
Compound 3, Dilution Series
Compound 3 (69.4 mg) was dissolved in TCE (25 mL) to prepare a stock solution. From this stock solution, a series of dilutions was prepared to give samples with concentrations ranging from $1.0 \cdot 10^{-6}$ mol/L to $1.0 \cdot 10^{-3}$ mol/L.
Compound 6, Dilution Series
Compound 6 (68.1 mg) was dissolved in TCE (25 mL) to prepare a stock solution. From this stock solution, a series of dilutions was prepared to give samples with concentrations ranging from $11.0 \cdot 10^{-6}$ mol/L to $5.0 \cdot 10^{-4}$ mol/L.

Dispersions of a Single Type of the Polymer-Substituted Organic Fluorescent Dyes According to the Invention Dispersion of Compound 3 (2 mg/mL) in Water/Olin 10G
A solution of compound 3 (20 mg) in THF/heptane (9:1, 1 mL) was added to an aqueous solution of Olin 10G (10 mL, 0.05% w/w). The overall mixture was ultrasonicated with an ultrasonication tip for 10 minutes.
Dispersion of Compound 3 and PIB (2 mg/mL) in Water/Olin 10G
A solution of compound 3 (20 mg) and PIB (20 mg) in THF (1 mL) was added to an aqueous solution of Olin 10G (10 mL, 2% w/w). The overall mixture was ultrasonicated with an ultrasonication tip for 10 minutes. DLS: mean particle 200 nm.
Dispersion of Compound 3 and PIB (2 mg/mL) in water/Olin 10G
A solution of compound 3 (20 mg) and PIB (20 mg) in THF/heptane (9:1, 1 mL) was added to an aqueous solution of Olin 10G (10 mL, 0.05% w/w). The overall mixture was ultrasonicated with an ultrasonication tip for 10 minutes. DLS: mean particle diameter 80 nm.
Dispersion of Compound 3 and PIB (2 mg/mL) in Water/Brij58
A solution of compound 3 (20 mg) and PIB (20 mg) in THF/heptane (9:1, 1 mL) was added to an aqueous solution of Brij58 (10 mL, 1% w/w). The overall mixture was ultrasonicated with an ultrasonication tip for 10 minutes.
Dispersion of Compound 3 and PIB (2 mg/mL) in Water/Brij S100
A solution of compound 3 (20 mg) and PIB (20 mg) in THF/heptane (9:1, 1 mL) was added to an aqueous solution of Brij S100 (10 mL, 1% w/w). The overall mixture was ultrasonicated with an ultrasonication tip for 10 minutes.
Dispersion of Compound 3 (1 mg/mL) in an Aqueous Solution of PVA/Olin 10G
An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before a solution of compound 3 (10 mg) in THF (1 mL) was added with a syringe. The overall mixture was ultrasonicated with an ultrasonication tip for 10 minutes.
DLS: mean particle diameter 283 nm.
Dispersion of Compound 3 (2 mg/mL) in an Aqueous Solution of PVA/Olin 10G
An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before a solution of compound 3 (20 mg) in THF (1 mL) was added with a syringe. The overall mixture was ultrasonicated with an ultrasonication tip for 10 minutes.
Dispersion of Compound 3 and PIB (1 mg/mL) in an Aqueous Solution of PVA/Olin 10G
An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before a solution of compound 3 (10 mg) and PIB (10 mg) in THF (1 mL) was added with a syringe. The overall mixture was ultrasonicated with an ultrasonication tip for 10 minutes.
Dispersion of Compound 3 and PIB (2 mg/mL) in an Aqueous Solution of PVA/Olin 10G
An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before a solution of compound 3 (20 mg) and PIB (20 mg) in THF (1 mL) was added with a syringe. The overall mixture was ultrasonicated with an ultrasonication tip for 10 minutes.
Dispersion of Compound 2 (1 mg/mL) in an Aqueous Solution of PVA/Olin 10G
An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before a solution of compound 2 (10 mg) in THF (1 mL) was added with a syringe. The overall mixture was ultrasonicated with an ultrasonication tip for 10 minutes.
Dispersion of Compound 6 (1 mg/mL) in an Aqueous Solution of PVA/Olin 10G
An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before a solution of compound 6 (10 mg) in THF (1 mL) was added with a syringe. The overall mixture was ultrasonicated with an ultrasonication tip for 10 minutes.
DLS: mean particle diameter 684 nm.

Mixtures of Dispersions of the Polymer-Substituted Organic Fluorescent Dyes According to the Invention Dispersion of Compounds 3 and 6 (1:1 v/v) in water/Olin 10G An aqueous dispersion of compound 3 (2 mg/mL, 2 Ml, Olin 10G) and an aqueous dispersion of compound 6 (2 mg/mL, 2 mL, Olin 10G), each prepared as described above, were mixed by stirring for 5 minutes. An analogous sample with the same composition was prepared by mixing the dispersions and ultrasonicating the mixtures with an ultrasonication tip for 5 minutes.

Dispersion of Compounds 3 and 6 (1:1 v/v) in an Aqueous Solution of PVA/Olin 10G A dispersion of compound 3 in an aqueous solution of PVA (1 mg/mL, 2 mL, Olin 10G) and a dispersion of compound 6 in an aqueous solution of PVA (1 mg/mL, 2 mL, Olin 10G), each prepared as described above, were mixed by stirring for 5 minutes.

DLS: mean particle diameter 325 nm. An analogous sample with the same composition was prepared by mixing the dispersions and ultrasonicating the mixtures with an ultrasonication tip for 5 minutes.

Dispersion of Compounds 3 and 6 (3:7 v/v) in an Aqueous Solution of PVA/Olin 10G A dispersions of compound 3 in an aqueous solution of PVA (1 mg/mL, 3 mL Olin 10G) and a dispersion of compound 6 in an aqueous solution of PVA (1 mg/mL, 7 mL, Olin 10G), each prepared as described above, were mixed by stirring for 5 minutes. An analogous sample with the same composition was prepared by mixing the dispersions and ultrasonicating the mixtures with an ultrasonication tip for 5 minutes.

Dispersion of Compounds 2, 3, and 6 (1:1:1 v/v/v) in an Aqueous Solution of PVA/Olin 10G Dispersions of compound 2 (1 mg/mL, 2 mL, Olin 10G), compound 3 (1 mg/mL, 2 mL, Olin 10G), and compound 6 (1 mg/mL, 2 mL, Olin 10G), each of which had been prepared from aqueous solutions of PVA as described above, were mixed by stirring 5 minutes. An analogous sample with the same composition was prepared by mixing the dispersions and ultrasonicating the mixtures with an ultrasonication tip for 5 minutes.

Dispersion of Compounds 2, 3, and 6 (15:1:4 v/v/v) in an Aqueous Solution of PVA/Olin 10G Dispersions of compound 2 (1 mg/mL, 7.5 mL), compound 3 (1 mg/mL, 0.5 mL), and compound 6 (1 mg/mL, 2 mL), each of which had been prepared from aqueous solutions of PVA as described above, were mixed by stirring for 5 minutes. An analogous sample with the same composition was prepared by mixing the dispersions and ultrasonicating the mixtures with an ultrasonication tip for 5 minutes.

Dispersions of Mixtures of the Polymer-Substituted Organic Fluorescent Dyes According to the Invention Dispersion of Compounds 3 and 6 (1:1 w/w) in Water/Olin 10G A solution of compound 3 (10 mg) and compound 6 (10 mg) in THF/heptane (9:1, 1 mL) was added to an aqueous solution of Olin 10G (10 mL, 0.05% w/w). The overall mixture was ultrasonicated with an ultrasonication tip for 10 minutes.

Dispersion of CompoundS 3 and 6 (1:1 w/w) in an Aqueous Solution of PVA/Olin 10G An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before first a solution of compound 3 (3.3 mg) in THF (1 mL) and then a solution of compound 6 (3.3 mg) in THF (1 mL) were added with a syringe. The overall mixture was ultrasonicated with an ultrasonication tip for 10 minutes.

DLS: mean particle diameter 313 nm.

Dispersion of Compounds 3 and 6 (3:7 w/w) in an Aqueous Solution of PVA/Olin 10G An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before first a solution of compound 3 (3 mg) in THF (1 mL) and then a solution of compound 6 (7 mg) in THF (1 mL) were added with a syringe. The overall mixture was ultrasonicated with an ultrasonication tip for 10 minutes.

Dispersion of Compounds 2, 3 and 6 (1:1:1 w/w/w) in an Aqueous Solution of PVA/Olin 10G An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before, successively, solutions of compound 2 (3.3 mg), compound 3 (3.3 mg) and compound 6 (3.3 mg) in THF (1 mL each) were added with a syringe. The overall mixture was ultrasonicated with an ultrasonication tip for 10 minutes.

Dispersion of Compounds 2, 3 and 6 (15:1:4 w/w/w in an Aqueous Solution of PVA/Olin 10G An aqueous solution of Olin 10G (50% w/w, 50 mg) was added to an aqueous solution of PVA (10% w/w, 10 mL). The mixture was ultrasonicated with an ultrasonication tip for 2 minutes and then cooled to room temperature before, successively, solutions of compound 2 (7.5 mg), compound 3 (0.5 mg) and compound 6 (2.0 mg) in THF (1 mL each) were added with a syringe. The overall mixture was ultrasonicated with an ultrasonication tip for 10 minutes.

Preparation of Color Conversion Films According to the Invention

Thin Film from a Dispersion of Compound 3 (1 mg/ml) on Glass Slide Made with R150 Roller A glass plate that had been cleaned by ultrasonication in organic solvents was dipped into a bath of concentrated aqueous NaOH. The plate was then washed with de-ionized water and dried under a jet of dry nitrogen. A dispersion of compound 3 (0.6 mL; 1 mg dye/mL) was placed on the pretreated glass slide and pressed into a film using a handheld Meyer bar (R200). The film was then dried in an oven at 60° C. for two hours.

Thin Film of PBI Dispersion (4 mg/ml) on Glass Slide Made with R150 Roller

A glass plate that had been cleaned by sonication in organic solvents was dipped into a bath of concentrated aqueous NaOH. The plate was then washed with de-ionized water and dried under a jet of dry nitrogen. A suspension of perelene bis-imide dye (0.6 mL; 4 mg dye/mL) was placed on the pretreated glass slide and pressed into a film using a handheld Meyer bar (R200). Film was then dried in an oven at 60° C. for two hours.

Thin Film of PBI Dispersion (4 mg/ml) on Glass Slide Made with R200 Roller

A glass plate that had been cleaned by sonication in organic solvents was dipped into a bath of concentrated aqueous NaOH. The plate was then washed with de-ionized water and dried under a jet of dry nitrogen. A suspension of perelene bis-imide dye (0.6 mL; 4 mg dye/mL) was placed on the pretreated glass slide and pressed into a film using a handheld Meyer bar (R200). Film was then dried in an oven at 60° C. for two hours.

Thin Film of PBI Dispersion (4 mg/mL) with TiO2 (4 mg/mL) on Glass Slide Made with R200 Roller A glass plate that had been cleaned by sonication in organic solvents was dipped into a bath of concentrated aqueous NaOH. The plate was then washed with de-ionized water and dried under a jet of dry nitrogen. TiO2 (4 mg) was added to PBI dispersion (5 mL) and stirred over night. The suspension of perelene bis-imide dye (0.6 mL; 4 mg dye/mL; 4 mg TiO2/5 mL) was placed on the pretreated glass slide and pressed into a film using a handheld Meyer bar (R200). Film was then dried in an oven at 60° C. for two hours.

Thin Film of PBI Dispersion (1 mg/mL) on PET Substrate Made with R200 Roller

A suspension of perelene bis-imide dye (1.5 mL; 1 mg dye/mL) was placed on a polyethylene terephthalate (PET) sheet and pressed into a film using a handheld Meyer bar (R200). Film was then dried in an oven at 60° C. for two hours. a clamp and ring stand and read at the most uniform place on the film.

Thin Film of PBI Dispersion (4 mg/mL) on PET Substrate Made with R200 Roller

A suspension of perelene bis-imide dye (1.5 mL; 4 mg dye/mL) was placed on a polyethylene terephthalate (PET) sheet and pressed into a film using a handheld Meyer bar (R200). Film was then dried in an oven at 60° C. for two hours.

Thin Film of PBI Dispersion (1 mg/mL) on PET Substrate Made with R150 Roller

A suspension of perelene bis-imide dye (1.5 mL; 1 mg dye/mL) was placed on a polyethylene terephthalate (PET) sheet and pressed into a film using a handheld Meyer bar (R150). Film was then dried in an oven at 60° C. for two hours.

Results

The polymer-substituted organic fluorescent dyes 1-7 were synthesized in good yields from the corresponding amine-terminated polymers and reactive fluorophors.

UV/vis spectra of solutions of the polymer-substituted organic fluorescent dyes 1-7 in a good solvent (such as THF) exhibited broad absorptions with several absorption bands each that were found to complement each other and, in this way, cover a range of absorptions between 400 nm and 620 nm. All solutions followed the Lambert-Beer law for all concentrations investigated.

Likewise, fluorescence spectra of solutions of the polymer-substituted organic fluorescent dyes 1-7 in a good solvent (such as THF) exhibited broad emissions with several absorption bands each that were found to complement each other and, in this way, cover a range of absorptions between 450 nm and 750 nm, i.e., most of the visible spectral range. Moreover, while self-absorption typically led to the disappearance of the lowest wavelength emission at the highest concentrations investigated only for cuvettes with long path lengths. In cuvettes with short path lengths, self-absorption was minimal. More importantly, no fluorescence quenching was observed for the polymer-substituted organic fluorescent dyes 1-7 (in contrast to conventional rylene dyes), not even at the highest concentrations investigated, highlighting the role of the attached polymer segments to shield the fluorescent cores and prevent aggregation. In this regard, the attachment of poly(isobutylene) segments proved to be particularly advantageous. Moreover, the polymer-substituted organic fluorescent dyes 1-7 gave rise to stable aqueous dispersions, in significant contrast to conventional rylene dyes that remained completely insoluble in aqueous media, also in the presence of any kind of surfactant, a hydrophilic polymers, or both. Particularly stable dispersions with the desired particle sizes between 100 and 400 nm are formed by the poly(isobutylene)-substituted dyes in the presence of poly(vinyl alcohol) as the hydrophilic polymer, and Olin 10G as the surfactant, and high molecular weight PIB as the matrix polymer upon ultrasonication, irrespective of the fluorescent core. These dispersions showed no change in average particle sizes over several weeks. In the same way, dispersions were also prepared from mixtures of the dyes. Furthermore, the obtained dispersions of different dyes can straightforwardly be mixed by stirring or ultrasonication. In all cases, the obtained dispersions containing two or more fluorescent dyes exhibited broad emissions and emitted white light when irradiated with a 400 nm (blue) light source. Particularly bright white emissions were, in this way, obtained from dispersions of different individual dyes in the presence of poly(vinyl alcohol) as the hydrophilic polymer, and Olin 10G as the surfactant, and high molecular weight PIB as the matrix polymer that have been mixed by stirring; mixing of these dispersions by ultrasonication (that will lead to dye mixing by colloid fission and fusion) and, likewise, dispersions of dye mixtures are noticeably less bright, highlighting the importance of "encapsulating" the different fluorescent dyes in the form of stable colloidal dispersions, as promoted by the attached polymer segments.

Finally, mechanically stable polymer films containing the polymer-substituted organic fluorescent dyes 1-7 can be prepared from either solutions of these dyes or their dispersions prepared as described above. Films exhibiting broad emission spectra and generating white light were obtained from both solutions and dispersions containing more than one of the polymer-substituted organic fluorescent dyes 1-7. Most notably, color conversion films with significantly improved emission efficiencies and life times (thermal and chemical stability) as compared to previously described color conversion films were from dispersions that had been prepared by mixing dispersions of individual dyes in the presence of poly(vinyl alcohol) as the hydrophilic polymer, and Olin 10G as the surfactant, and high molecular weight PIB as the matrix polymer by stirring and drying the hydrophilic phase.

The invention claimed is:

1. A color conversion film comprising
   (i) a flexible transparent substrate (H),
   (ii) at least one active layer (G),
   (iii) at least one optical in-coupling layer (I),
   (iv) at least one encapsulation layer (K),
   (v) at least one optical out-coupling layer (J),
   wherein said active layer (G) compresses an organic fluorescent dye containing a single fluorescent core, wherein said dye is substituted with at least one non-fluorescent polymer segment.

2. Color conversion film according to claim 1, wherein said polymer segment is selected from the group consisting of poly(styrene), poly(methyl methacrylate), poly(butyl methacrylate), poly(butyl acrylate), poly(isoprene), poly(butadiene), hydrogenated poly(isoprene), poly(cyclooctene), poly(tetrafluoroethylene) and its copolymers, or poly(isobutylene).

3. Color conversion film according to claim 1, wherein the fluorescent core is selected from the family of core-substituted or unsubstituted rylene dyes.

4. Color conversion film according to claim 1, wherein said dye furthermore comprises a linking group between the fluorescent core and the polymer, said linking group being selected from the group consisting of imide, amide, ester, amine, or an heteroatom O.

5. Color conversion film according to claim 4, wherein said dye furthermore comprises a spacer group between the polymer and the linking group and/or between the fluorescent core and the linking group.

6. Color conversion film according to claim 1, wherein said dye is selected from the group consisting of:

7. Color conversion film according to claim 1, wherein said active layer comprises several different sub-layers.

8. Color conversion film according to claim 7, wherein each of said sub-layer is obtained from a solution of one different type of dyes.

9. Color conversion film according to claim 7, wherein each of said sub-layer is obtained from a colloidal dispersion of one type of dyes.

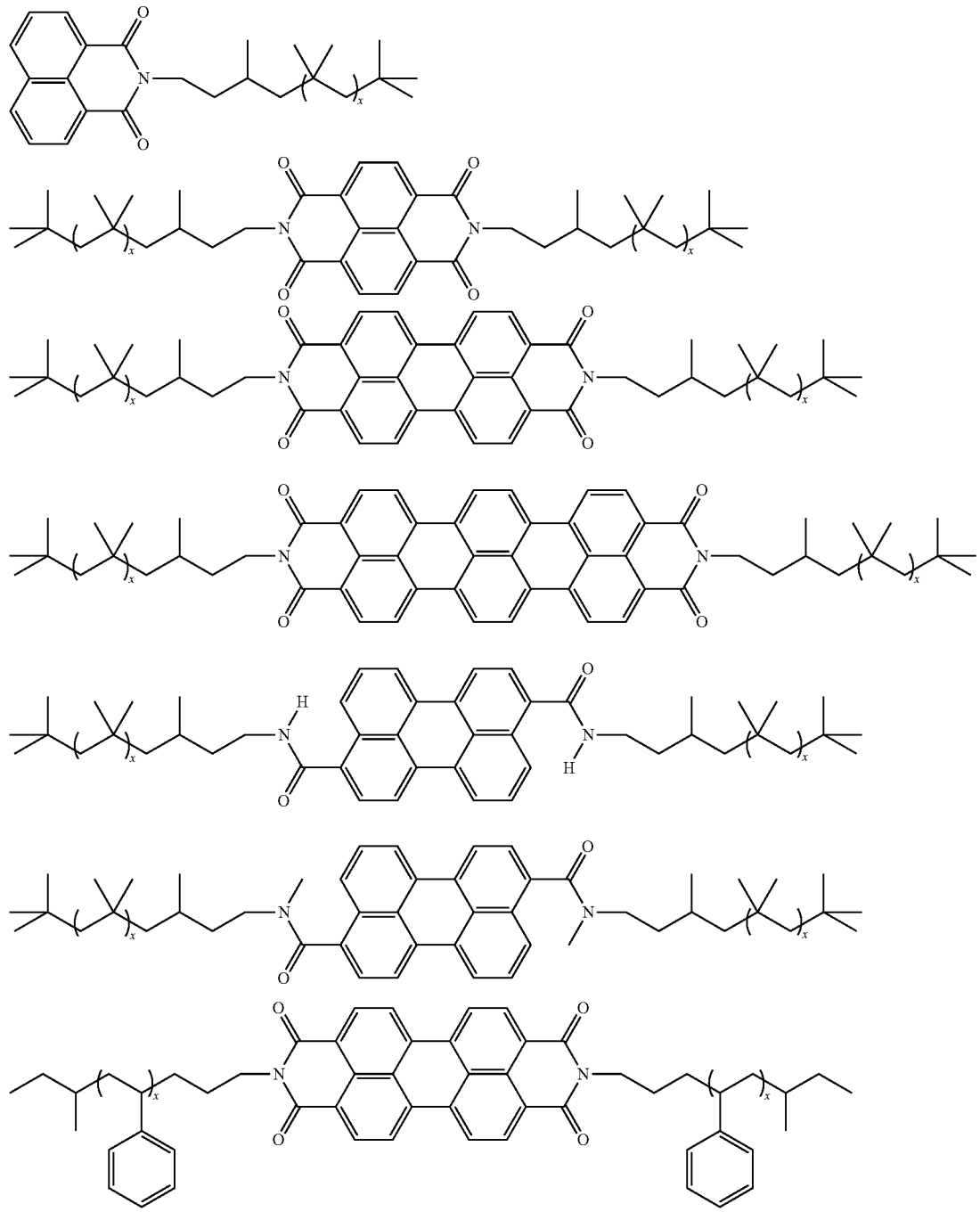

with x representing an integer of 10 to 50.

10. Color conversion film according to claim 1, wherein said active layer is obtained from at least one solution of said dye or one colloidal dispersion of said dye.

11. Color conversion film according to claim 9, wherein said colloidal dispersion furthermore comprises water, a polar solvent (A), a surfactant (B), a hydrophobic polymer (C), a hydrophilic polymer (D), a moderately polar cosolvent (E) and an unpolar cosolvent (F).

12. Color conversion film according to claim 9, wherein the colloidal dispersion is formed from a mixture of dispersions of one type of said dyes.

13. Color conversion film according to claim 9, wherein the colloidal dispersion is formed from the mixture of several dispersions formed from several types of said dyes or from one type of said dyes.

14. Color conversion film according to claim 9, wherein the colloidal dispersion of said dye is prepared by a method comprising:
- (i) providing a first solution of surfactant (B) and the hydrophilic polymer (D) in a mixture of water and solvent (A);
- (ii) providing a second solution of said dye and the hydrophobic polymer (C) in a mixture of the moderately polar cosolvent (E) and the unpolar cosolvent (F);
- (iii) adding the second solution to the first solution;
- (iv) subjecting the mixture to a strong agitation and/or sonication.

15. Color conversion film according to claim 9, wherein the colloidal dispersion of the mixture of colloidal dispersions of several types of said dyes is prepared by a method comprising:
- (i) providing a first solution of surfactant (B) and the hydrophilic polymer (D) in a mixture of water and solvent (A);
- (ii) providing a second solution of at least two different types of said dyes and the hydrophobic polymer (C) in a mixture of the moderately polar cosolvent (E) and the unpolar cosolvent (F);
- (iii) adding the second solution to the first solution;
- (iv) subjecting the mixture to a strong agitation and/or sonication.

16. Color conversion film according to claim 9, wherein the mixture of several colloidal dispersions formed from one type of said dyes or several types of said dyes is obtained by the mixing of at least two of the colloidal dispersions of one type of said dye or at least two of the colloidal dispersions of a mixture of several types of said dyes.

17. A process for preparation of the color conversion film according to claim 1 comprising the following steps:
- (i) providing a flexible transparent substrate (H),
- (ii) applying at least one active layer (G) comprising said organic fluorescent dye by coating,
- (iii) applying at least one optical in-coupling layer (I) by coating,
- (iv) applying at least one encapsulation layer (K) by coating,
- (v) applying at least one optical out-coupling layer (J) by coating.

18. A process according to claim 17, wherein the active layer is obtained following a process which comprises a step of preparing a solution or a colloidal dispersion.

19. Color conversion film according to claim 1, wherein the at least one polymer segment is not built from repeating unity comprising the fluorescent core, and the fluorescent core is different from the at least one polymer segment.

20. Color conversion film according to claim 1, wherein the at least one polymer segment is a non-fluorescent hydrophobic polymer chain that serves as a matrix for isolating the fluorescent core from another fluorescent core.

21. A color conversion film according to claim 3, wherein the rylene dye is selected from the group consisting of naphthalenes, perylenes, terrylenes or quaterrylenes.

* * * * *